United States Patent
Currid

(10) Patent No.: US 10,208,502 B2
(45) Date of Patent: Feb. 19, 2019

(54) INFLATABLE ROOFTOP TENT SYSTEM FOR VEHICLES

(71) Applicant: Tepui Outdoors, Inc., Soquel, CA (US)

(72) Inventor: Evan Michael Currid, Santa Cruz, CA (US)

(73) Assignee: TEPUI OUTDOORS, INC., Soquel, CA (US)

( * ) Notice: Subject to any disclaimer, the term of this patent is extended or adjusted under 35 U.S.C. 154(b) by 0 days.

(21) Appl. No.: 15/693,215

(22) Filed: Aug. 31, 2017

(65) Prior Publication Data

US 2019/0017287 A1   Jan. 17, 2019

Related U.S. Application Data

(60) Provisional application No. 62/382,661, filed on Sep. 1, 2016.

(51) Int. Cl.
*E04H 15/20*   (2006.01)
*E04H 15/06*   (2006.01)
(Continued)

(52) U.S. Cl.
CPC .............. *E04H 15/20* (2013.01); *B60P 3/341* (2013.01); *E04H 15/06* (2013.01); *E04H 15/324* (2013.01);
(Continued)

(58) Field of Classification Search
CPC .............. E04H 15/06; E04H 15/20; B60P 3/38
(Continued)

(56) References Cited

U.S. PATENT DOCUMENTS 2,811,725 A   11/1957 Cence
2,937,651 A   5/1960 Tassel
(Continued)

FOREIGN PATENT DOCUMENTS

DE   1780662   10/1973
FR   2158927   6/1973
WO   2005005754 A1   1/2005

OTHER PUBLICATIONS

AutoHome Columbus—the roof top car tent for any vehicle, download from http://www.autohomeus.com/roof-top-tents/columbus-tent/ on Apr. 11, 2016 (2 pages).
(Continued)

*Primary Examiner* — Noah Chandler Hawk
(74) *Attorney, Agent, or Firm* — Patent Law Works LLP

(57) ABSTRACT

A tent system may include a base system adapted to mount to a roof of a vehicle, an inflatable tent frame, and a canopy. The base system may include a rigid platform and an air delivery mechanism integrated into the base system, the air delivery mechanism may have an air port adapted to receive pressurized air. The tent system may include an inflatable tent frame including an inflatable tube coupled with the base system, the inflatable tube having an air inlet coupled with the air delivery mechanism, the air inlet receiving the pressurized air from the air delivery mechanism into the inflatable tube, the inflatable tube adapted to support a tent canopy when the inflatable tube is inflated using the pressurized air. The tent canopy may be attached to the base.

20 Claims, 14 Drawing Sheets

(51) Int. Cl.
  *E04H 15/64* (2006.01)
  *E04H 15/56* (2006.01)
  *B60P 3/34* (2006.01)
  *E04H 15/32* (2006.01)

(52) U.S. Cl.
  CPC ............. *E04H 15/56* (2013.01); *E04H 15/64* (2013.01); *E04H 2015/201* (2013.01); *E04H 2015/206* (2013.01); *E04H 2015/208* (2013.01)

(58) Field of Classification Search
  USPC ...................................................... 135/88.16
  See application file for complete search history.

(56) References Cited

U.S. PATENT DOCUMENTS

| | | |
|---|---|---|
| 3,924,365 A | 12/1975 | Orberg |
| 3,957,068 A | 5/1976 | Cox |
| 3,968,809 A | 7/1976 | Beavers |
| D244,182 S | 5/1977 | Skidmore et al. |
| D246,365 S | 11/1977 | Floyd |
| 4,058,133 A | 11/1977 | Barr et al. |
| D250,013 S | 10/1978 | Siciliano |
| D255,027 S | 5/1980 | Hemminger |
| 4,271,856 A | 6/1981 | Ferguson |
| 4,366,979 A | 1/1983 | Pillot |
| D273,001 S | 3/1984 | Fink |
| 4,522,441 A * | 6/1985 | Allison .................... B60P 3/38 135/88.17 |
| 4,548,438 A | 10/1985 | Myers |
| D299,223 S | 1/1989 | Galvin |
| D310,806 S | 9/1990 | Hertzberg et al. |
| D318,446 S | 7/1991 | Magyar et al. |
| D318,971 S | 8/1991 | Mitchell |
| D327,463 S | 6/1992 | Williams |
| D330,182 S | 10/1992 | Jones |
| D332,934 S | 2/1993 | Brown et al. |
| D333,646 S | 3/1993 | Levy |
| 5,190,066 A | 3/1993 | Joergensen |
| 5,203,603 A | 4/1993 | Hertzberg et al. |
| 5,226,261 A * | 7/1993 | Wilbourn ................ B60J 7/102 52/2.21 |
| D340,689 S | 10/1993 | Wolcott et al. |
| D342,707 S | 12/1993 | Fields |
| D352,328 S | 11/1994 | Boyd |
| D352,690 S | 11/1994 | Schorr |
| 5,544,671 A | 8/1996 | Phillips |
| D382,248 S | 8/1997 | Long |
| 5,806,906 A | 9/1998 | Hammond |
| D413,096 S | 8/1999 | Russke et al. |
| D421,956 S | 3/2000 | Aubut |
| 6,035,875 A | 3/2000 | Chen |
| D428,382 S | 7/2000 | Hall |
| D428,595 S | 7/2000 | Salinas |
| D431,225 S | 9/2000 | Perlman et al. |
| 6,145,525 A | 11/2000 | Mooney |
| D444,445 S | 7/2001 | Schroeder |
| D445,397 S | 7/2001 | Gaytan |
| 6,260,306 B1 * | 7/2001 | Swetish .................. E04H 15/20 135/124 |
| 6,263,617 B1 * | 7/2001 | Turcot .................... E04H 15/20 52/2.11 |
| D454,328 S | 3/2002 | Cornelius |
| D461,759 S | 8/2002 | Napieraj |
| 6,722,084 B2 * | 4/2004 | Berman ................. E04H 15/006 135/120.1 |
| D503,143 S | 3/2005 | Napieraj |
| D516,497 S | 3/2006 | Napieraj |
| D521,414 S | 5/2006 | Waters |
| 7,100,625 B2 | 9/2006 | Valles |
| D544,402 S | 6/2007 | Westman et al. |
| D574,315 S | 8/2008 | Swails et al. |
| D610,067 S | 2/2010 | Frankham |
| D619,077 S | 7/2010 | Frankham |
| D619,078 S | 7/2010 | Frankham |
| D620,995 S | 8/2010 | Hamad |
| D628,126 S | 11/2010 | Tai |
| D662,444 S | 6/2012 | Smoak et al. |
| 8,245,464 B2 * | 8/2012 | Saiz ...................... A01G 9/1415 52/222 |
| 9,222,278 B2 | 12/2015 | Park |
| D765,013 S | 8/2016 | Hindelang et al. |
| 2003/0213512 A1 * | 11/2003 | Lee ........................ E04H 15/20 135/126 |
| 2008/0190472 A1 * | 8/2008 | Turcot ..................... E04H 6/04 135/126 |
| 2008/0313970 A1 * | 12/2008 | Turcot .................... E04H 15/20 52/2.18 |
| 2016/0138293 A1 | 5/2016 | Zhou |

OTHER PUBLICATIONS

Ebay Indigo Campers Roof Top Tent Review, download from https://outbackjoe.com/macho-divertissement/machoarticles/ebay-roof-top-tent-review/ on Apr. 11, 2016 (24 pages).

Product Spotlight: The new ARB Simpson III Roof Top Tent, download from http://forum.ih8mud.com/threads/product-spotlight-the-new-arb-simpson-iii-roof-top-tent.306676/ on Apr. 11, 2016 (12 pages).

* cited by examiner

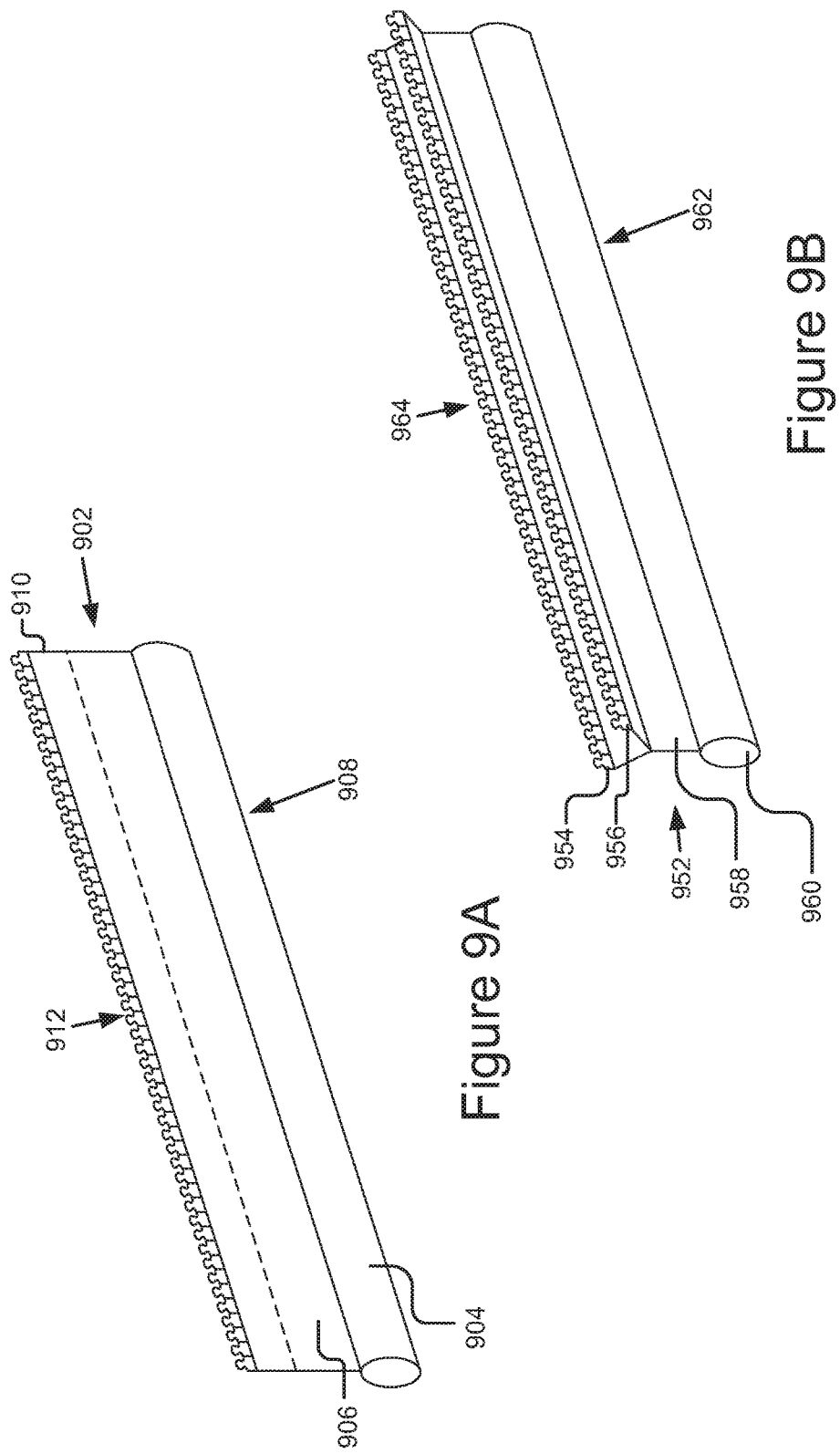

INFLATABLE ROOFTOP TENT SYSTEM FOR VEHICLES

CROSS-REFERENCE TO RELATED APPLICATIONS

This application claims the benefit under 35 U.S.C. § 119(e) of U.S. Provisional Application No. 62/382,661, entitled "Inflatable Base and Frame Vehicle Roof Top Tent Where a Composite Shell is Used in Conjunction with Inflatable Tubes that Support an Internal Base Platform and a Tent Canopy. When the Inflatable Tubes are Fully Inflated the Inner Base will be Supported at or above the Height of the Side Walls of the Exterior Composite Structure or Shell of the Tent Allowing for a Mostly Flat Surface for an Occupant to Sleep on. The Tent Canopy will also be Supported by an Inflatable Air Tube Frame," filed on Sep. 1, 2016, the entire contents of which are incorporated herein by reference.

BACKGROUND

The present disclosure relates to roof-top tents that are mountable on a vehicle.

Many outdoors enthusiasts enjoy camping, but setting up a tent can be time consuming and inconvenient, especially when there are no suitable places to put a tent. Additionally, it is frequently beneficial to be located off the ground to avoid disturbing or being disturbed by wildlife. One solution to such a problem is a roof-top tent that attaches to the top of a vehicle. Unfortunately, current roof-top tents also present various shortcomings. Existing root-top tents include bulky frames and pads making them heavy and difficult to lift onto the roof of a vehicle. Additionally, such existing roof-top tents are thick when stowed on top of the vehicle thereby causing substantial wind resistance and resistance and reducing efficiency of the vehicle.

Accordingly, there is a need among such tents to provide a tent system which is thin and light.

SUMMARY

According to one innovative aspect of the subject matter described in this disclosure, a tent system includes a base system, an inflatable tent frame, and a canopy. For example, a tent system may include: a base system adapted to mount to a roof of a vehicle, the base system including a rigid platform with a perimeter edge and an air delivery mechanism integrated into the base system, the air delivery mechanism having an air port adapted to receive pressurized air, the base system including mounting hardware for attaching the tent system to the roof of the vehicle; an inflatable tent frame including an inflatable tube coupled with the base system, the inflatable tube having an air inlet coupled with the air delivery mechanism, the air inlet receiving the pressurized air from the air delivery mechanism into the inflatable tube, the inflatable tube adapted to support a tent canopy when the inflatable tube is inflated using the pressurized air; and the tent canopy including a flexible membrane having a canopy fastener, the canopy fastener extending along a perimeter of the flexible membrane and adapted to attach the flexible membrane to the perimeter edge of the rigid platform, the tent canopy forming an interior cavity with the base system when the inflatable tube is inflated.

In general, another innovative aspect of the subject matter described in this disclosure may be embodied in methods that include operations for the use and manufacture of the system above.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation, in the figures of the accompanying drawings in which like reference numerals are used to refer to similar elements.

FIGS. 9A and 9B are perspective views of example implementations of interconnecting members.

DETAILED DESCRIPTION

Figure 1:
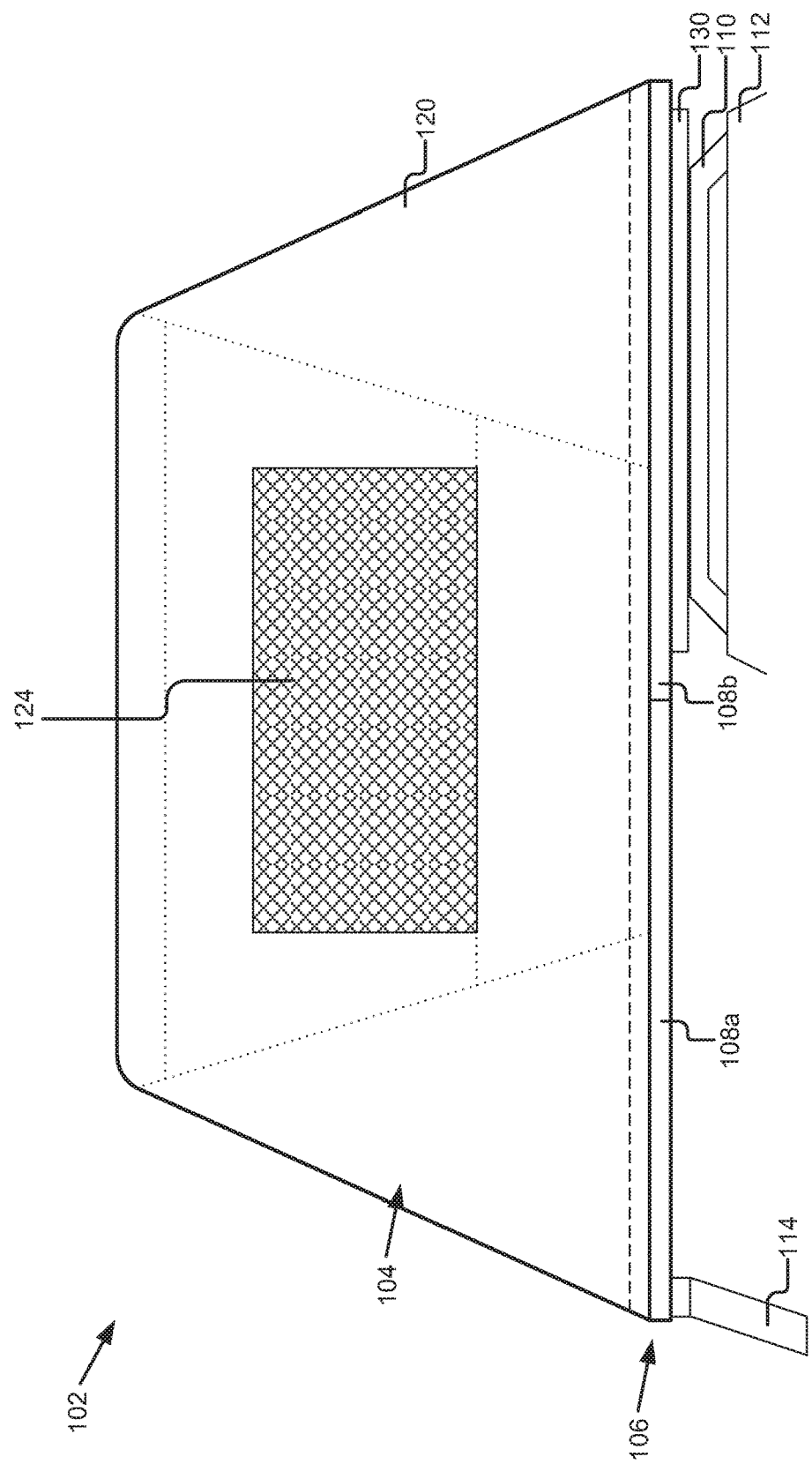
FIG. 1 is a side view of an example implementation of a tent system in an open position and mounted to a vehicle.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components. Further, it should be noted that aspects of certain components may be described in reference to one component, but these aspects may be applicable to none, some, or all of the components, depending on the implementation.

The present disclosure describes an innovative technology relating to roof-top tents for vehicles 112. The tent system 102 solves many of the shortcomings of existing tents, especially roof-top tents, for example, the shortcomings described in the Background. The tent system 102 described herein provides an integrated system for quickly setting up a vehicle roof-top tent using an inflatable tent frame 204 and, in some instances, an inflatable pad. The inflatable tent frame 204 and, in some instances, inflatable pad reduce the weight and, when deflated, the thickness of the tent system 102 allowing low profile hinges to be used, and reducing the dimensions of the tent system 102 when stored (e.g., in a folded or closed position) on top of a vehicle 112. The integrated inflatable tent system 102 described herein is also substantially lighter than previous roof-top tents that include, for example, metal tent frames, thick mattress pads, and, in some instances, require thicker base support structures. Accordingly, while past root-top tent systems are 9 to 12 inches thick when folded and weigh approximately 200 pounds, the tent system 102 described herein can be as thin as 4-8 inches thick when folded and weigh as little as 75 pounds or less, although it should be noted that these specifications are provided by way of example and not limitation.

These advantages are provided by the configuration and interaction of components, such as the air frame technology and the inflatable pad coupled with the rigid platform described herein. For example, according to some implementations, the inflatable pad (e.g., the drop stitch panel, inflatable mattress pad, or inflatable chamber described herein) may allow thinner and/or different configurations of rigid platforms 202 than past roof-top tents, as described in further detail below.

Figure 6A:
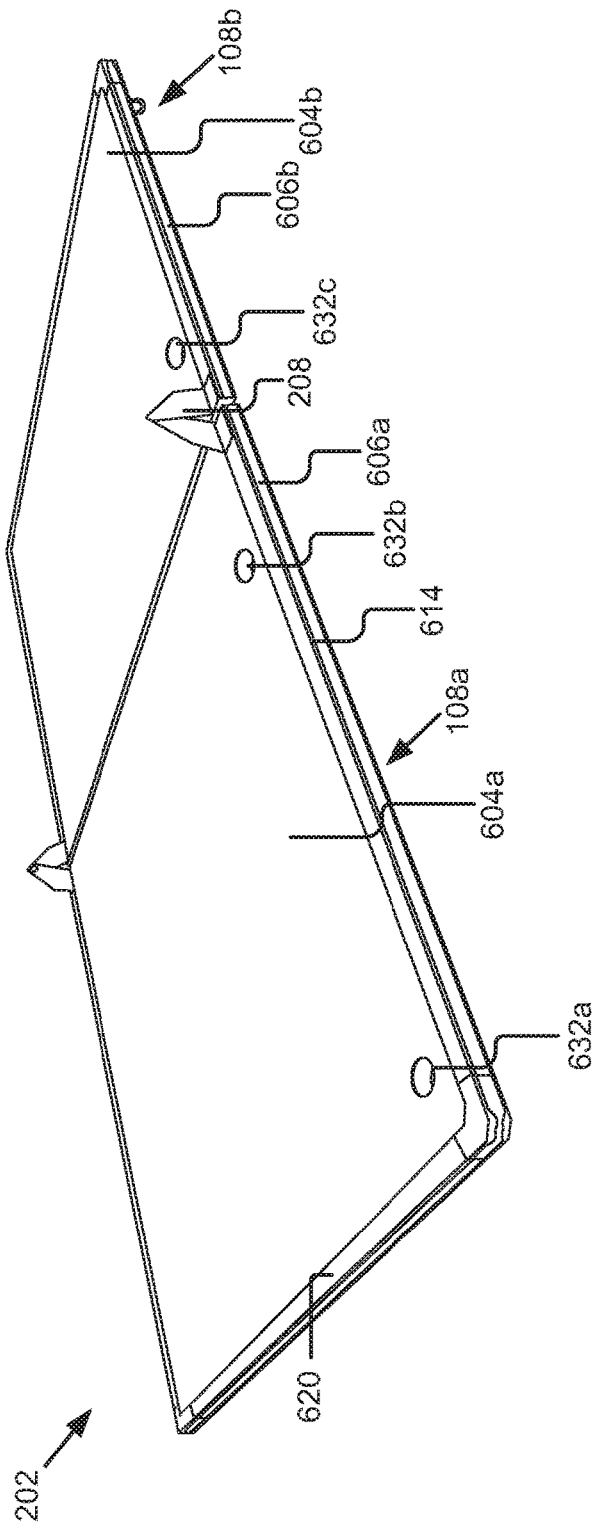
FIG. 6A is a perspective view of an example implementation of a rigid platform in an open position.
Figure 6B:
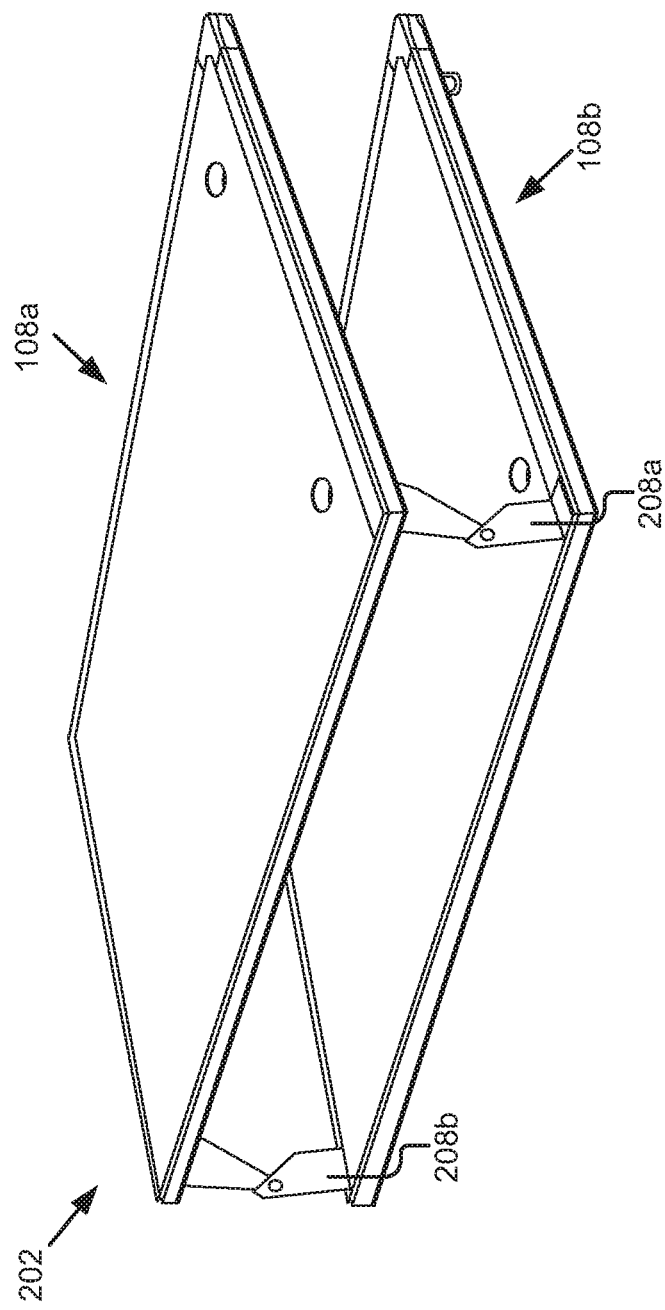
FIG. 6B is a perspective view of an example implementation of a rigid platform in a closed position.

FIG. 1 is a side view of an example implementation of a tent system 102 in an open position (e.g., an open position of a rigid platform 202 is shown in FIG. 6A and a closed position is shown in FIG. 6B). In some implementations, the tent system 102 may include a canopy 104, an inflatable tent frame 204 (not illustrated in FIG. 1), and a base system 106.

The base system 106 may include a rigid platform 202 formed by one or more base members 108a and 108b (e.g., the base members 108a and 108b are components of the rigid platform 202), an air delivery mechanism (not illustrated in FIG. 1), and, in some instances, an inflatable pad (not illustrated in FIG. 1). The base system 106 may be attachable to a roof rack 110 of a vehicle 112. Additionally, a base member 108 may include, or have attached thereto, a support 114 to support the rigid platform 202, for instance, to support a base member 108a extending beyond the side of the vehicle 112, as illustrated. For example, a second base member 108a may extend beyond a side of the vehicle 112 when the tent system 102 is in an open position so that, when the tent system 102 is in an open position, a surface of the first and second base members 108a and 108b are substantially planar thereby providing a flat floor surface for the interior of the tent system 102.

A base member 108 may include mounting hardware, such as transversely mounted rails 130 configured to rest perpendicularly across a standard vehicle 112 roof rack 110 (although the rails 130 or other mounting hardware may have other configurations). In some implementations, the mounting hardware may include welds, bolts, or any other hardware, which may be used to securely attach the base system 106 to the vehicle 112. The rigid platform 202 provides support to the tent system 102, for example, when the tent system 102 is mounted to the vehicle 112. The rigid platform 202 and base system 106 are described in further detail throughout this disclosure.

The support 114 may include any mechanism configured to support the base member 108. For example, in some implementations, the support 114 may be a ladder attached to the bottom or side of a base member 108. The ladder may then be used to support the base member 108 and to enable a person to climb into the tent system 102. The support 114 may be attached to the base member 108 using bolts, rivets, adhesive, or any other mounting mechanism. In some implementations, the support 114 may fold along the surface of the base member 108 for storage when not needed to support the base member 108. In some implementations, the support 114 may be slidably mounted to the base member 108 allowing the support 114 to be deployed under or adjacent to the base member 108 to provide vertical support, and then to slide, retract, or fold into a cavity or channel formed in the base member 108 for storage.

In some implementations, the base system 106 may include an air delivery mechanism (e.g., as illustrated and described throughout this disclosure) integrated into or attached to the base system 106. The air delivery mechanism may include one or more air ports 210 adapted to receive pressurized air. For example, an air port 210 may receive or connect to an air hose coupled to an air compressor, air pump, etc. In some implementations, the air port 210 of the air delivery mechanism includes a valve integrated into a base member 108 proximate to the edge where the support 114 (e.g., ladder) is located, thereby providing easy access to the valve to fill the inflatable component(s) of the tent system 102 with pressurized air. The air delivery mechanism may deliver the pressurized air to the inflatable tent frame 204 (e.g., as described in reference to FIG. 2A) and/or an inflatable air chamber or pad (e.g., as described in reference to FIGS. 2B, 3B, 3C, 7A, and 7B). It should further be noted that the air delivery mechanism, in some implementations, may include an integrated air pump.

The canopy 104 covers at least a portion of the base member 108 to form the tent system's roof and/or sides. The rigid platform 202 may define a perimeter edge around which a canopy 104 may be attached. In some implementations, the canopy 104 includes a flexible membrane 120, which may include or define a membrane edge 132. The membrane edge 132 may include a canopy fastener 804 (e.g., as described in reference to FIGS. 8-9B) affixed thereto for connecting the canopy 104 to the base system 106 around the perimeter edge of the rigid platform 202. For example, the canopy fastener may connect to the interconnecting member fastener 816 (e.g., as described in reference to FIGS. 8-9B). In some implementations, the canopy 104 may include a bottom pan membrane (not shown) and the membrane edge 132 may be located along the intersection between the bottom pan membrane and the flexible membrane 120. The canopy 104 and base system 106 (and/or bottom pan membrane) form an interior cavity of the tent system 102 when the tent system 102 is an open position and, for example, the inflatable tent frame 204 is inflated.

The flexible membrane 120 may be constructed of any type of flexible material, such as fabric, canvas, mesh, vinyl, nylon, polyester, etc. An interconnecting member 806 (e.g., as described in further detail in reference to FIGS. 8-9B) enables a user to quickly and easily replace a mesh canopy 104 (e.g., for dry or summer use) with a water resistant canopy 104 (e.g., for rain). In some implementations, the interconnecting member 806 may enable a first canopy 104 (e.g., a water resistant canopy 104) to be attached to the base system 106 at the same time as a second canopy 104 (e.g., a mesh canopy 104). For example, the interconnecting member fastener 816 is configured to quickly and interchangeably align any canopy fastener 804 and affix the corresponding canopy(ies) 104 to the base system 106.

As shown in FIG. 1, the flexible membrane 120 of the canopy 104 may be include one or more windows 124 and one or more doors (not illustrated in FIG. 1), and one or more vents (not shown in FIG. 1). For example, a door may be located adjacent or above the edge of the tent system 102 supported by the support member 114 (e.g., a ladder). The door may be constructed of a flexible membrane, such as a lightweight poly-oxford material and may include a mesh or clear plastic window formed in the door. A vent may be located at the window 124, at a top of the canopy 104, or elsewhere on the canopy 104 for providing ventilation to the interior of the tent system 102.

In some implementations, the canopy 104 may include a rainfly attached to or integrated with the canopy 104. For example, a rainfly can be attached to the base system 106 in place of or in addition a canopy 104 thereby providing weather protection. The rainfly may be attached to the inflatable tent frame 204 and/or canopy 104 using Velcro, straps, or other attachment means and may be supported using the same inflatable tent frame 204 as the canopy 104. In some implementations, the rainfly may extend beyond the edges of the base system 106 to cover the base system 106 and protect it from weather. It should be noted that other implementations of the rainfly are possible and contemplated herein.

The vehicle 112 may include any vehicle 112 capable of supporting the tent system 102, however, it should be understood that the tent system 102 may be used in other configurations. For example, although the tent system 102 is particularly beneficial for use when mounted to a vehicle 112, due to the rigid platform 202, the tent system 102 may be placed on the ground or mounted to any other object (e.g., a tree, a stand, trailer, etc.).

Figure 2A:
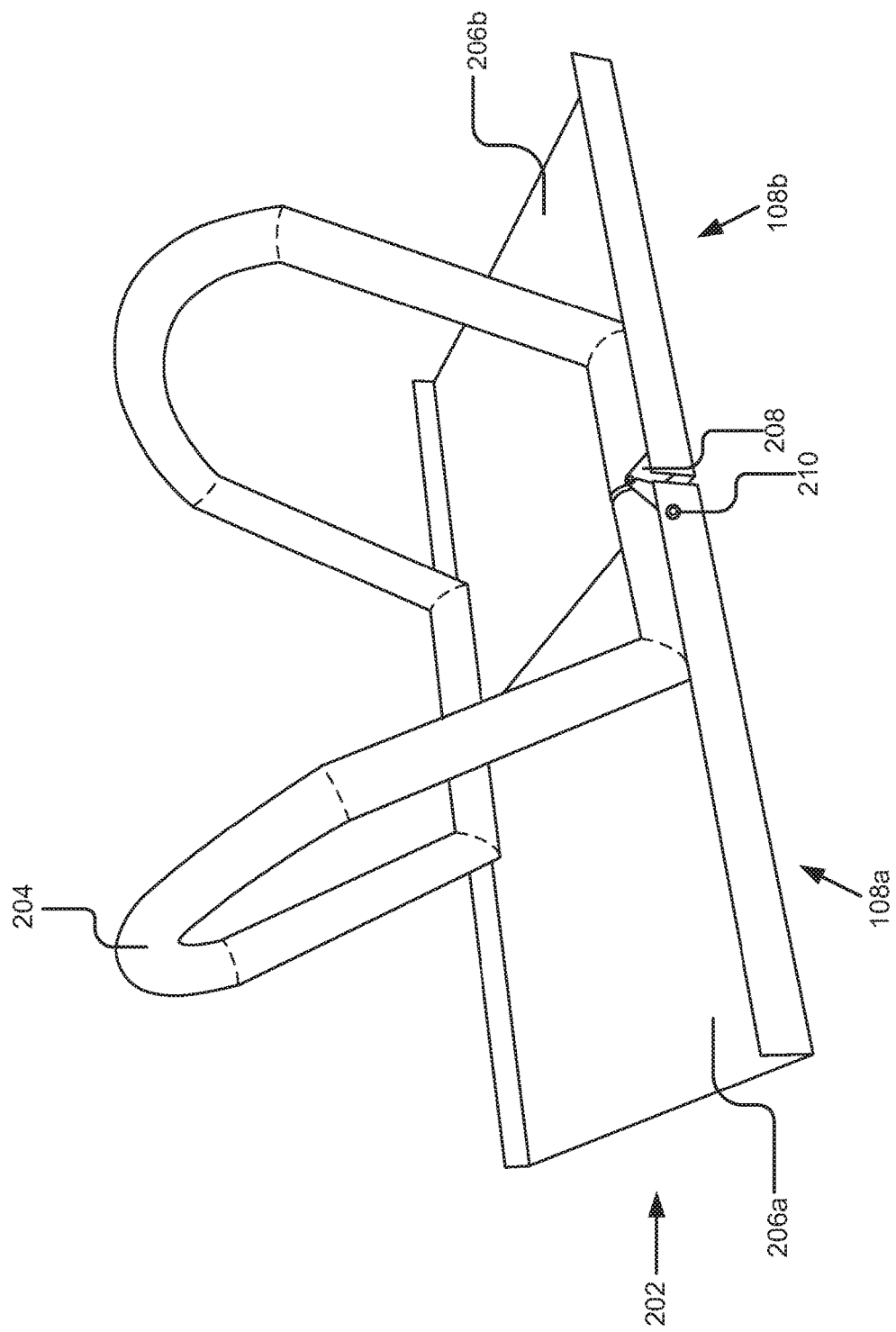
FIG. 2A is a perspective view of an example implementation of a base system and inflatable tent frame in an open position.

FIG. 2A is a perspective view of an example implementation of a base system 106 and inflatable tent frame 204, according to the present disclosure, in an open position. The base system 106 may include a rigid platform 202 and, in some implementations, one or more hinges 208.

As shown, the rigid platform 202 may include one or more base members 108a and 108b. A base member 108a may comprise a first rectangular body defining a first base member surface 206a and a second base member 108b may comprise a second rectangular body defining a second base member surface 206b. The first and second base member surfaces 206 may form an interior floor of the tent system 102 when the tent system 102 is in an open position, as illustrated. For example, the first and second base members 108 may be pivotally attached together using one or more hinges 208 that allow the base members 108 to fold out to and open position where they are substantially level with one another. As illustrated in FIG. 2A, the second base member surface 206b may be positioned on a substantially horizontal plane with the first base member surface 206a when the tent system 102 is in an open position. The base system 106 may pivot about an axis defined by the hinge 208 to fold the second base member 108a into the parallel plane over the first base member 108b and position the tent system 102 into a closed position, for example, as illustrated in FIG. 6B.

Figure 2B:
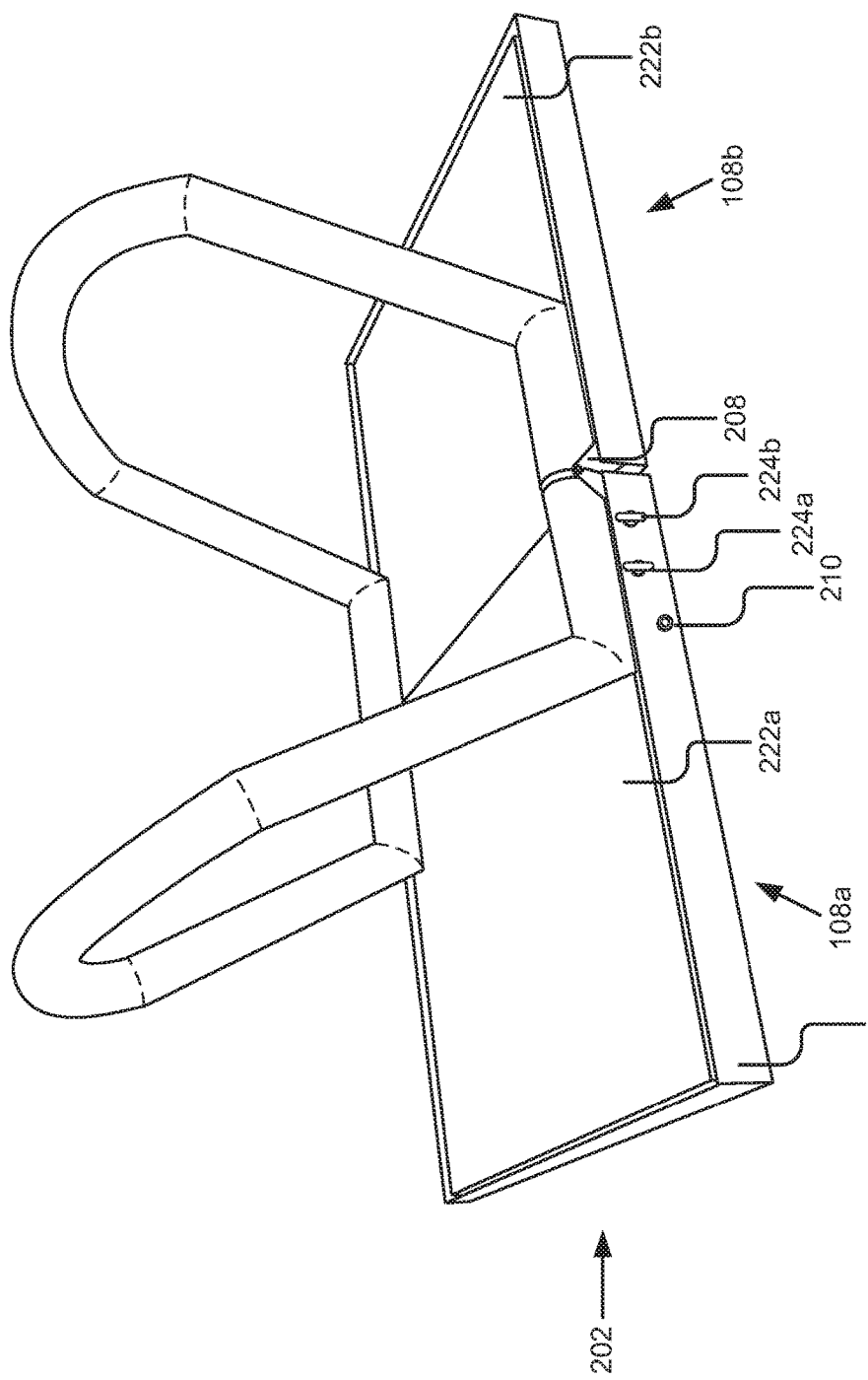
FIG. 2B is a perspective view of an example implementation of a base system, inflatable tent frame, and pad in an open position.

The inflatable tent frame 204 may include an inflatable tube (or other shape of air chamber) coupled with the base system 106. The inflatable tent frame 204 may be coupled to the rigid platform 202, a hinge 208, or a pad (e.g., as illustrated in FIG. 2B), for example, using straps passing over the inflatable tent frame 204, Velcro, magnets, snaps or clasps, D-rings, or other mechanisms.

The inflatable tube may be constructed of any flexible, air tight material (e.g., vinyl covered polyester, various plastics, etc.), and is adapted to support a tent canopy 104 when the inflatable tent frame 204 is inflated. It should be noted that implementations of the inflatable tent frame 204 may have any number or configuration of air chambers to support different sized and shaped canopies without departing from the scope of this disclosure. As illustrated, the inflatable tent frame 204 includes two arches having an arch diameter of approximately three feet to provide ample room inside the interior cavity of the tent system 102 while remaining compact and wind resistant, although other implementations are possible.

In some implementations, the inflatable tent frame 204 has an air inlet (not illustrated in FIG. 2A) that couples with the air delivery mechanism, so that the air inlet receives pressurized air from the air delivery mechanism into the inflatable tent frame 204. In some implementations, the air port 210 (e.g., a fill valve, opening with a cap, etc.) may be integrated with one or more of the base members 108, a pad (e.g., as illustrated in FIG. 2B), or directly in the inflatable tent frame 204 itself. For example, the air delivery mechanism may include a fill valve or nozzle that passes through a hole in the rigid platform 202 to connect to the air inlet of the inflatable tent frame 204 to the outside of the tent system 102, for example, so the inflatable components of the tent system 102 can be filled without a user climbing into the tent system 102

The hinge(s) 208 may include any type of hinge mechanism which allows the base system 106 to fold to a closed position (e.g., as in FIG. 6B), but remain substantially flat in an open position. Further the pivot point of the hinge 208 may be raised off the plane formed by the first and second base members 108, so that when the base system 106 is folded in a closed position, there is enough space between the first and second base members 108 to fit other components (e.g., canopy(ies) 104, inflatable tent frames 204, pads, etc.). The sides of the hinge 208 may be bolted to, welded to, integrally formed with, or otherwise attached to the base members 108.

In some implementations, the air delivery mechanism, or a component thereof may be coupled with the hinge 208. For example, a fill valve may pass through, be coupled with, or be integrated with the hinge 208. In some implementations, the air delivery mechanism may include a manifold 502 with flexible or pivoting components attached to or adjacent to the hinge 208 in order to deliver pressurized air to inflatable components coupled to each of the base members 108a and 108b while remaining coupled to the inflatable components even when the tent system 102 is in a closed position.

In some implementations, the inflatable tent frame 204 may have one or more air outlets for evacuating the pressurized air from the inflatable tent frame 204 and/or for communicating air between the inflatable tent frame 204 and another inflatable component of the tent system 102, such as an inflatable pad, drop stitch panel, air chamber, etc. In some implementations, the inflatable tent frame 204 may be integrated with an inflatable pad as a single unit (e.g., the inflatable tent frame 204 may be attached to the pad and form a contiguous air chamber) or, for instance, these components may be communicatively coupled by a valve(s) or a manifold 502.

The inflatable tent frame 204 is configured to support the canopy 104 (not shown in FIG. 2A). For example, the canopy 104 may be attached to hang from a bottom of the inflatable tube, or the canopy 104 may be laid (and, in some instances, attached) over the top of the inflatable tube. In some instances, the inflatable tent frame 204 may include protrusions and/or connections for attaching a rainfly, as described above.

Figure 3A:
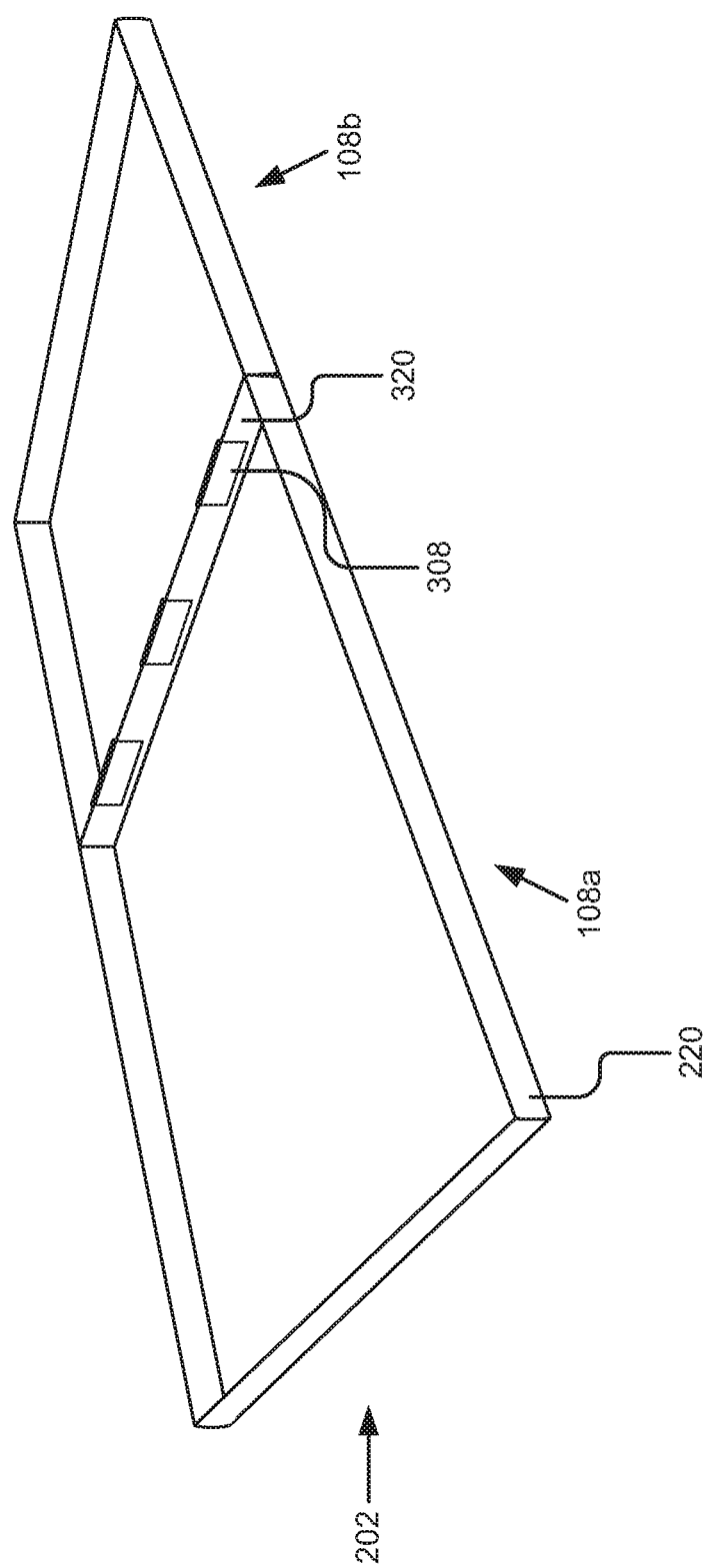
FIG. 3A is a perspective view of an example implementation of a rigid platform in an open position.

FIG. 2B is a perspective view of an example implementation of a base system 106, inflatable tent frame 204, and pad(s) 222, according to the present disclosure, in an open position. As illustrated in the implementation of FIG. 2B, the rigid platform 202 may include one or more raised edges 220 for protecting the tent system 102 (e.g., the inflatable tent frame 204, pad(s) 222, canopy 104, and/or other components) when the tent system 102 is folded in a closed position. In some implementations, where raised edges are included on the rigid platform 202, the raised edges 220 may be along two, three, or four sides of each base member 108, for instance, as illustrated in FIGS. 2A, 2B, and 3A, respectively. For example, as illustrated in FIG. 2A, the raised edges 220 may be reduced in size or omitted from the ends of the rigid platform 202 (e.g., near a door) and from the junction between two base members 108. In another example, as illustrated in FIG. 2B, the raised edges 220 may be reduced in size or omitted from the side of the base members 108 at the junction between the base members 108. In yet another example, as illustrated in FIG. 3A, the raised edges may extend around all four sides of each base member 108 in order to form a closed clamshell when the tent system 102 is in a closed position.

In some implementations, the base system 106 may include one or more pads 222a and 222b resting on the rigid platform 202 and forming a floor surface of the tent system 102. As illustrated, the inflatable tent frame 204 may rest on top of the pad(s) 222, although other implementations are possible, such as where the tent frame 204 rests on top of the rigid platform 202 and the pad(s) 222 are sized or contoured around the inflatable tent frame 204. In some implementations, the pad(s) 222 may be inflatable or may include one or more inflatable chambers. For example, as illustrated in FIG. 2B, the base system 106 may include a first inflatable chamber (e.g., 222a) coupled (e.g., via D-rings, Velcro, magnets, straps, clips, interconnecting members, etc.) with the first rectangular body of the first base member 108 at a first base member surface (e.g., 206a) and a second inflatable chamber (e.g., 222b) coupled with the second rectangular body of the second base member 108 at the second base member surface (e.g., 206b).

In some implementations, the pads 222a and 222b may include a first and second inflatable chamber coupled with the air delivery mechanism and the air delivery mechanism may be configured to deliver pressurized air to the first and second inflatable chamber. In some implementations, the first and second inflatable chambers may be coupled together so that air may flow between them, the air delivery mechanism may include a manifold 502 connected to the first and second inflatable chamber, or the air delivery mechanism may include a first air port 210 for the first inflatable chamber and a second air port 210 for the second inflatable chamber. Example implementations of the inflatable air chambers are described in further detail in reference to FIGS. 3B, 3C, 7A, and 7B.

The air delivery mechanism or components thereof may be integrated into the base system 106. In some implementations, the air delivery mechanism may include a manifold 502 (e.g., an example of which is illustrated and described in reference to FIG. 5), which may be integrated into the rigid platform 202. In some implementations, the first and second air chambers are inflatable mattress pads, which are coupled with the manifold 502 and the manifold 502 is adapted to deliver pressurized air from a filling valve (e.g., an air port 210) to one or more of the inflatable mattress pads and the inflatable tent frame 204. For example, a manifold 502 (not visible in FIG. 2B) may be integrated into the rigid platform 202. A manifold may include an air port 210 and one or more valves 224a and 224b controlling distribution of pressurized air from the manifold 502 into inflatable components of the tent system 102. It should be noted that although the air port 210 and handles of the valves 224 are located on the side of the rigid platform 202, one or more of these components may be located on a bottom or another surface of the rigid platform 202 (e.g., when tent system 102 is in an open position, as illustrated).

FIG. 3A is a perspective view of an example implementation of a rigid platform 202, according to the present disclosure, in an open position. As illustrated, the rigid platform 202 includes a first base member 108a and a second base member 108b, each base member 108 having raised edges 220 and 320 around their perimeters, so that when the tent system 102 is folded into a closed position, the first and second base members 108 form a clamshell with a rigid exterior surface.

In some implementations, the first and second base members 108 may have one or more raised edges 320 at the junction between the first and second base members 108, thereby enclosing a clamshell when the tent system 102 is in a closed position. An enclosed clamshell may be more durable, aerodynamic, and protected from wind and rain than a tent system 102 with one or more open or soft sides in a closed position. The ability to have raised edges 320 at the junction between the base members 108 may be made possible by raising a floor surface of the base system 106 above the raised edge(s) 320 using a drop stitch panel, inflatable mattress pad, or inflatable chamber and rigid panel combination, as described in further detail throughout this disclosure. For example, when the drop stitch panel, inflatable mattress pad, or inflatable chamber is inflated, the floor surface of the base system 106 may be supported at or above the height of the raised edge 320 (and/or 220) of the clamshell/rigid platform 202, thereby creating a flat surface for an occupant of the tent system 102 to sleep on. Example implementations where the floor surface is raised using a drop stitch panel or an inflatable chamber and rigid panel combination are illustrated in reference to FIGS. 3B and 3C respectively.

In some implementations, the rigid platform 202 (or components thereof) may be constructed from wood, aluminum, carbon fiber, composite, fiberglass, or a honeycomb material, etc. For example, as illustrated, the first and second base members 108 may be shells made from a rigid material, such as composite or fiberglass. In some implementations, the use of drop stitch panels allows the rigid platform 202 to be a thin shell (e.g., a clamshell, as illustrated), because the drop stitch panels may provide additional rigidity to the rigid platform 202 thereby better supporting the weight of an occupant inside the tent system than a shell alone, as described in further detail below, for example, in reference to FIGS. 3B and 7A.

As illustrated, the rigid platform 202 may include low profile hinges, such as piano hinges 308, although other types of hinge mechanisms are possible and contemplated. Accordingly, the tent system 102 can be compact when closed. For example, the dimensions of a base member 108 may have a width that is wide enough for two, three, or four occupants to sleep inside the tent system 102 (e.g., 50, 52, 54, or more inches) and have a length short enough to fit on top of a vehicle 112 (e.g., a width of the vehicle 112) when closed (e.g., 42 to 48 inches) and long enough to accommodate an occupant's height when open (e.g., 84 to 96 inches). The raised edges 220 and 320 of the base system 106 may be approximately 2 to 4 inches, so that when the tent system 102 is closed, the height of the tent system 102 is 4 to 8 inches (e.g., the combination of raised edges from two halves of the base system).

Figure 3B:
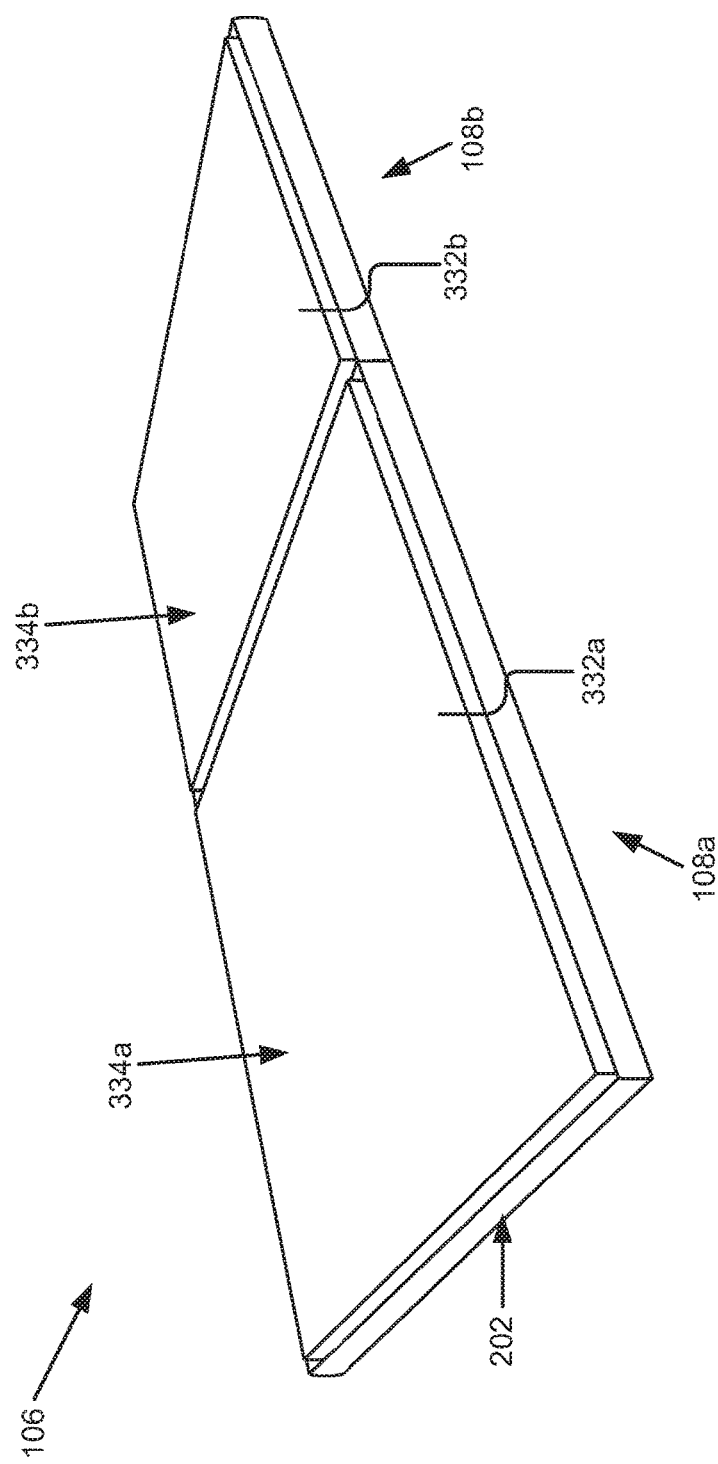
FIG. 3B is a perspective view of an example implementation of a rigid platform and inflatable air chamber in an open position.

FIG. 3B is a perspective view of an example implementation of a rigid platform 202 in an open position and inflatable air chambers 334a and 334b. In some implementations, the inflatable air chamber(s) 334 may include a drop stitch panel. For example, as illustrated in FIG. 3B, the base system 106 may include a first drop stitch panel (e.g., 334a) coupled with the first base member 108 and a second drop stitch panel (e.g., 334b) coupled with the second base member 108. A top surface of the first drop stitch panel 334a may form a first interior floor surface 332a and a top surface of the second drop stitch panel 334b may form a second interior floor surface 332b, so that when each of the first and second drop stitch panels 334 are inflated by the pressurized air, the first and second interior floor surfaces 332 raise so that they are substantially level with each other to form a flat surface (e.g., above a raised edge 320, in some implementations).

In some implementations, the rigid platform 202 may include various contours. For instance, a clamshell may be aerodynamically shaped and/or include contours to accommodate a ladder recessed into a channel in the rigid platform 202, mounting hardware, a roof rack, etc. Accordingly, the inflatable chambers 334, such as the drop stitch panels or inflatable mattress pads, may be shaped to fill or be supported above such contours or obstructions in the rigid platform 202 so that the interior floor surface of the base system 106 is flat when the inflatable chambers 334 are inflated.

Figure 3C:
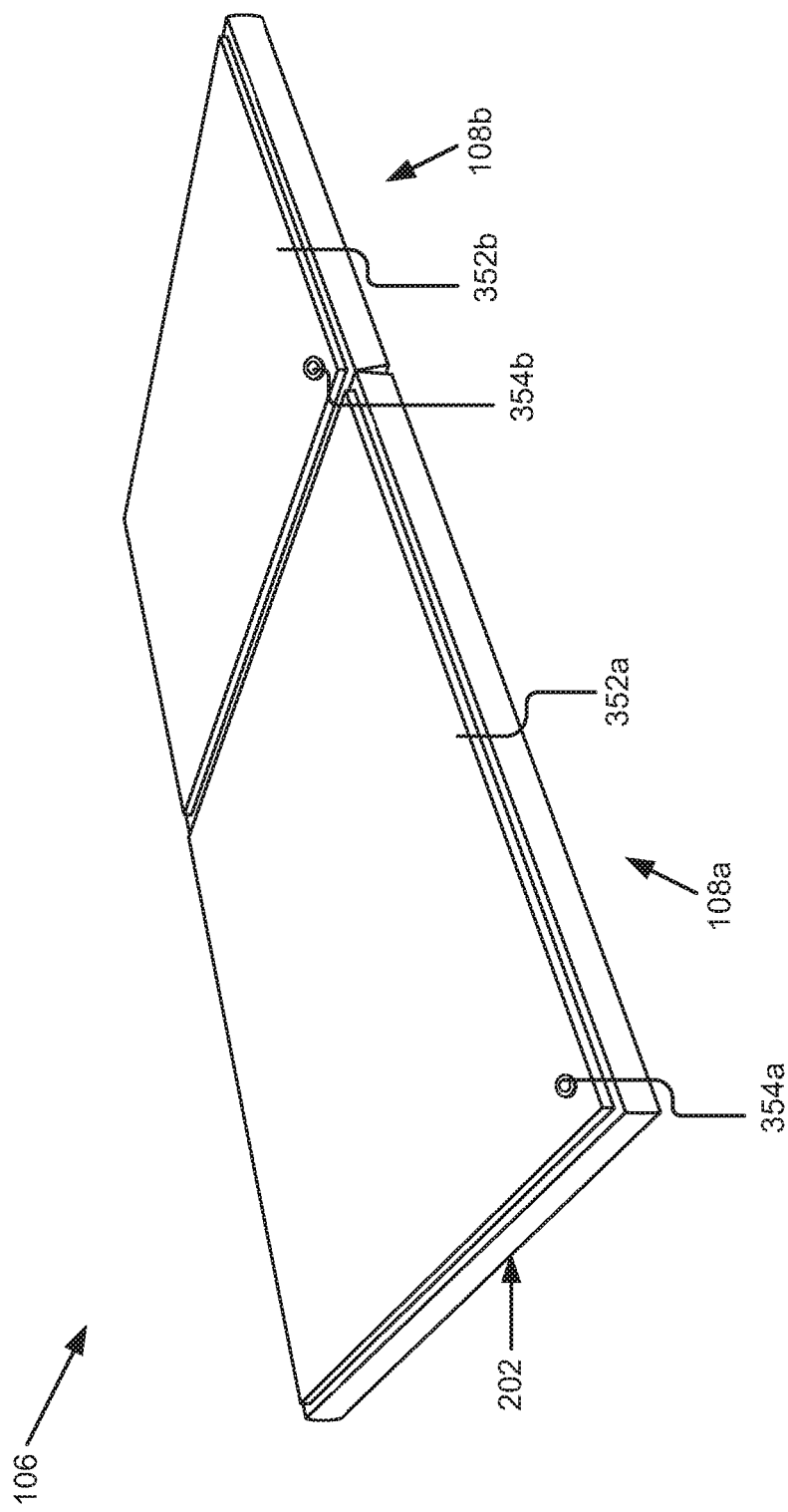
FIG. 3C is a perspective view of an example implementation of a rigid platform and movable floor panel in an open position.

FIG. 3C is a perspective view of an example implementation of a rigid platform 202 and rigid panels 352a and 352b, according to the present disclosure, in an open position. For example, the rigid panels 352 may rest on top of inflatable air chambers (not visible in FIG. 3C), which, when inflated, lift the rigid panels off the rigid platform 202 in order to create a flat floor surface. For example, as described above, the inflation of the air chambers may lift the floor surface (e.g., a top surface of the rigid panels 352) above a raised edge (e.g., 220 or 320) of the base system 106. For instance, the first rigid panel 352a may be lifted using a first air chamber and a second rigid panel 352b may be lifted using a second air chamber to create a substantially flat surface across the first and second rigid panels 352.

The inflatable air chambers (not visible in FIG. 3C) that lift the rigid panels 352 may include inflatable tubes or pads around the perimeter edge and/or center of a base member 108. The inflatable air chambers may be coupled with the air delivery mechanism (e.g., via a manifold 502, via the inflatable tent frame 204, or via one or more air ports 210 integrated with the rigid platform 202). In some implementations, the air chambers for lifting the rigid panels 352 may include air ports/valves 354a and 354b passing through one or more of the base members 108 and the rigid panels 352.

Figure 4B:
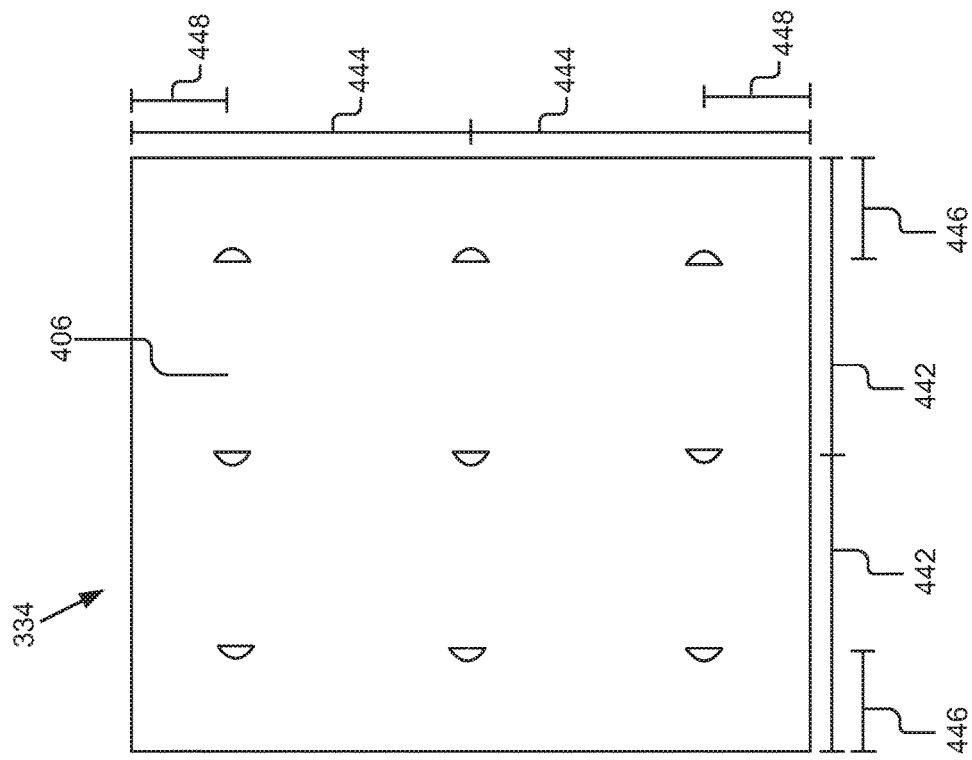
FIGS. 4A and 4B are illustrations of an example configuration of connection mechanisms for connecting a drop stitch panel to a rigid platform.
Figure 4A:
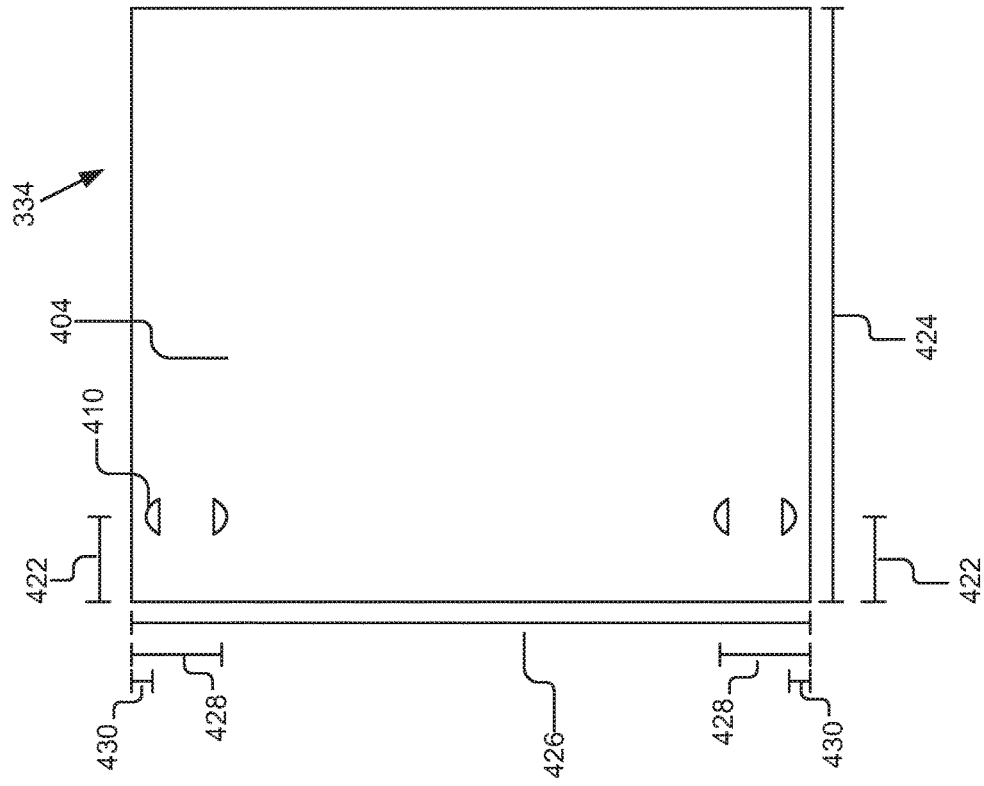

FIGS. 4A and 4B are illustrations of an example configuration of connection mechanisms for connecting a drop stitch panel 334 to a rigid platform 202 and, in some instances, other components of the tent system 102. FIG. 4A may illustrate a top surface 404 of an example drop stitch panel 334 and FIG. 4B may illustrate a bottom surface 406 of the example drop stitch panel 334. As illustrated, one or both of the top surface 404 and bottom surface 406 may include connection mechanisms that may attach the drop stitch panel 334 to a base member 108, a rigid panel 352, an inflatable tent frame 204, or another component of the tent system 102. For example, in some implementations, the connection mechanisms may include D-rings 410, which attach to straps, clasps, clamps, or other mechanisms.

As illustrated in FIGS. 4A and 4B, a drop stitch panel 334 may have a specific quantity, positioning, and orientation of D-rings 410, which may facilitate attaching the drop stitch panel 334 to other components of the tent system 102; however, it should be understood that the quantities, measurements, and orientations are provided by way of example and that other implementations are possible without departing from the scope of this disclosure.

In the depicted implementation, measurements may represent exact values or ranges of near (e.g., within 2-4 inches) the given values. Regarding the measurements of the top surface 404 of the drop stitch panel 334 illustrated in FIG. 4A, the measurement 424 may be approximately 42½ inches, the measurement 426 may be approximately 54¼ inches, the measurement 422 may be approximately 12 inches, the measurement 428 may be approximately 5 inches, and the measurement 430 may be approximately ½ inches. Regarding the measurements of the bottom surface 406 of the drop stitch panel 334 illustrated in FIG. 4B, the measurement 442 of the D-rings at approximately the midpoint of the drop stitch panel 334 may be approximately 27 to 28 inches, the measurement 444 of the D-rings at approximately the midpoint of the drop stitch panel 334 may be approximately 22 to 23 inches, the measurement 446 may be approximately 6 inches, and the measurement 448 may be approximately 10 inches. The four D-rings on the top surface 404 of the drop stitch panel 334 and the nine D-rings on the bottom surface 406 of the drop stitch panel 334 provide an even distribution of tension incurred by the drop stitch panel 334 when it is coupled with other members of the tent system 102, thereby increasing the strength and ease of assembly of the system.

Figure 5:
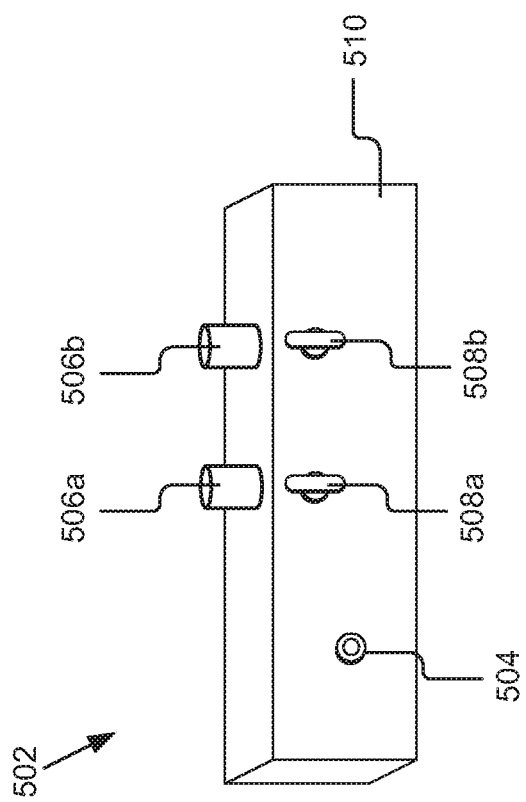
FIG. 5 is a perspective view of an example implementation of a manifold.

FIG. 5 is a perspective view of an example implementation of a manifold 502. For example, the air delivery system may include air port 210 and a manifold 502. In some implementations, the air port 210 may be integrated with the manifold 502. The manifold 502 may include any pipe or chamber branching into multiple openings that allows air to pass from an air inlet (e.g., an air port 210 or filling valve) to one or more outlets 506a and 506b (and/or, in some implementations, from the outlets to the inlet, to vacate the pressurized air from the system). For example, the manifold 502 may include multiple openings or outlets 506 for distributing pressurized air to components of the tent system 102, such as the inflatable tent frame 204, inflatable tubes, drop stitch panel(s), air chamber(s), or mattress pad(s).

In some implementations, the manifold 502 may include one or more valves 508 controlling the distribution of the pressurized air, for example, a first valve 508a may control delivery of the pressurized air from the manifold 502 to the inflatable tent frame 204 (e.g., via a first opening 506a) and a second valve 508b may control delivery of the pressurized air from the manifold 502 to an inflatable mattress pad or drop stitch panel, etc. (e.g., via the second opening 506b). It should be noted that although the handles of shut-off valves 508 are illustrated, other valves are possible and contemplated herein. For instance, a valve 508 may include a pressure regulating valve so that, for example, the pressure of the tent frame 204 may be a first set pressure and the pressure of a drop stitch panel may be a second set pressure. Accordingly, for example, once the inflatable pad is inflated to a certain pressure (e.g., a given PSI or pounds of pressure per square inch), the valve(s) 508 may redirect the pressurized air so that the inflatable tent frame 204 may be automatically inflated.

In some implementations, as described briefly above, the manifold 502 may be integrated with or attachable to the base system 106. For instance, the manifold 502 may include a tube located inside a body of the rigid platform 202 and connecting the air inlet/filling valve 504 with the air inlet of inflatable tent frame 204 (and/or drop stitch panels, air chambers, etc.). In some implementations, the manifold 502 may be attachable to or integrated with one or more base members 108, a hinge 208, the inflatable tent frame 204, an air chamber, inflatable mattress pad, and/or drop stitch panel, as described in various implementations herein.

In some implementations, the manifold 502 may be soft or flexible so that it is compressible along with, for example, the inflatable tent frame 204. For instance the body 510 and outlets 506 of the manifold 502 may be constructed from a flexible membrane that is air tight and inflatable to distribute pressurized air to one or more of the inflatable components of the tent system 102 while consuming less physical space when not in use (e.g., when the tent system 102 is in a closed position).

FIG. 6A is a perspective view of an example implementation of a rigid platform 202 in an open position. In the illustrated implementation, the rigid platform 202 includes a first rigid surface 604a (e.g., of a first base member 108a) and a second rigid surface 604b (e.g., of a second base member 108b), each rigid surface 604a and 604b defining a perimeter edge 606a and 606b, respectively. The rigid surfaces 604a and 604b of the base members 108a and 108b may be pivotally attached together using one or more hinges 208. It should be noted that features described in reference to base member 108a may be equally applicable to base member 108b and vice versa.

As illustrated in FIG. 6A, the second rigid surface 604b may be positioned on a substantially horizontal plane with the first rigid surface 604a when the rigid platform is in an open position. Further, the second rigid surface 604b may be adapted to fold over the first rigid surface 604a when the rigid platform is in a closed position, for example, as illustrated in FIG. 6B.

The rigid surfaces 604a and 604b may be solid or include some other construction, such as a flat top and an interior constructed using honeycombs, corrugations, foam, hat channels, I beams, or any other construction that allows the rigid surface to remain substantially rigid when supporting the weight of a user and/or gear inside the tent, especially when the tent system 102 is in an open position. A rigid surface 604 may be constructed of steel, aluminum, fiberglass, wood, carbon fiber, or one or more other materials that provide sufficient strength to support the weight of a user and/or gear.

Each rigid surface 604 may be a rectangular prism, although other implementations are possible. In some implementations, each rigid surface 604 may have one or more perimeter edges 606. For example, as shown, a first rigid surface 604a has a first perimeter edge 606a and a second rigid surface 604b has a second perimeter edge 606b. In some implementations, the rigid surface 604 has one or more channels 614 along the perimeter edges 606. The channels 614 may be configured to receive and retain an attachment member 808 of the interconnecting member 806, as described in further detail in reference to FIGS. 8-9B.

Each channel 614 may be adapted to receive and retain an attachment member 808. For example, the channel 614 may be a channel formed within the perimeter edge 606 or formed within a component 620 attached to the perimeter edge 606. The channel may be shaped in such a way as to receive an attachment member 808, such as a bolt cord 904 (e.g., as described in reference to FIGS. 8-9B).

In some implementations, the rigid platform 202 may include an air delivery mechanism integrated with the rigid platform 202. An air delivery mechanism may include one or more fill valves or nozzles (not illustrated in FIG. 6A) passing through one or more perforations 632a, 632b, and 632c in the rigid platform 202. For example, a nozzle may be coupled to one or more of the manifold 502, inflatable tent frame 204, inflatable tube, pad, or other inflatable component of the tent system 102. The nozzle may pass through a perforation 632 in the rigid platform 202 to allow access by a user to deliver pressurized air through the nozzle into the manifold 502, inflatable tent frame 204, pad, etc. In some implementations, the nozzle may be a component of the manifold 502, inflatable tent frame 204, pad, etc., but may be held in place at the perforation 632, for example, by a washer, cap, attachment mechanism, etc. In some implementations, the nozzle or perforation 632 may include an attachment mechanism into which an air hose (e.g., coupled with a pump or air compressor) may be received and retained.

The locations and quantity of the illustrated perforations 632 are provided as an example of the locations of perforations 632, air ports 210, nozzles, valves, or other components of the air delivery mechanism. For example, a perforation 632a or air port 210 may be located proximate to an edge of the second base member 108 near a ladder supporting the second base member 108. In another example, a first perforation 632b or air port 210 may be located adjacent to a hinge 208 on a first base member 108 and a second perforation 632c may be located adjacent to the hinge 208 on the second base member 108.

FIG. 6B is a perspective view of an example implementation of a rigid platform 202 in a closed position. FIG. 6B illustrates a rigid platform 202 with a first base member 108a folded over a second base member 108b into a parallel plane when the tent system 102 is in a closed position. The base system 106 is shown pivoting about the hinges 208a and 208b. It should be noted that other components of the tent system 102, such as the tent frame 204, pads, canopy 104, etc., are not shown in FIG. 6B. It should also be noted that other example implementations of the rigid platform 202 (e.g., those illustrated in FIGS. 1-3C) may fold in a similar fashion as illustrated in FIG. 6B.

Figure 7A:
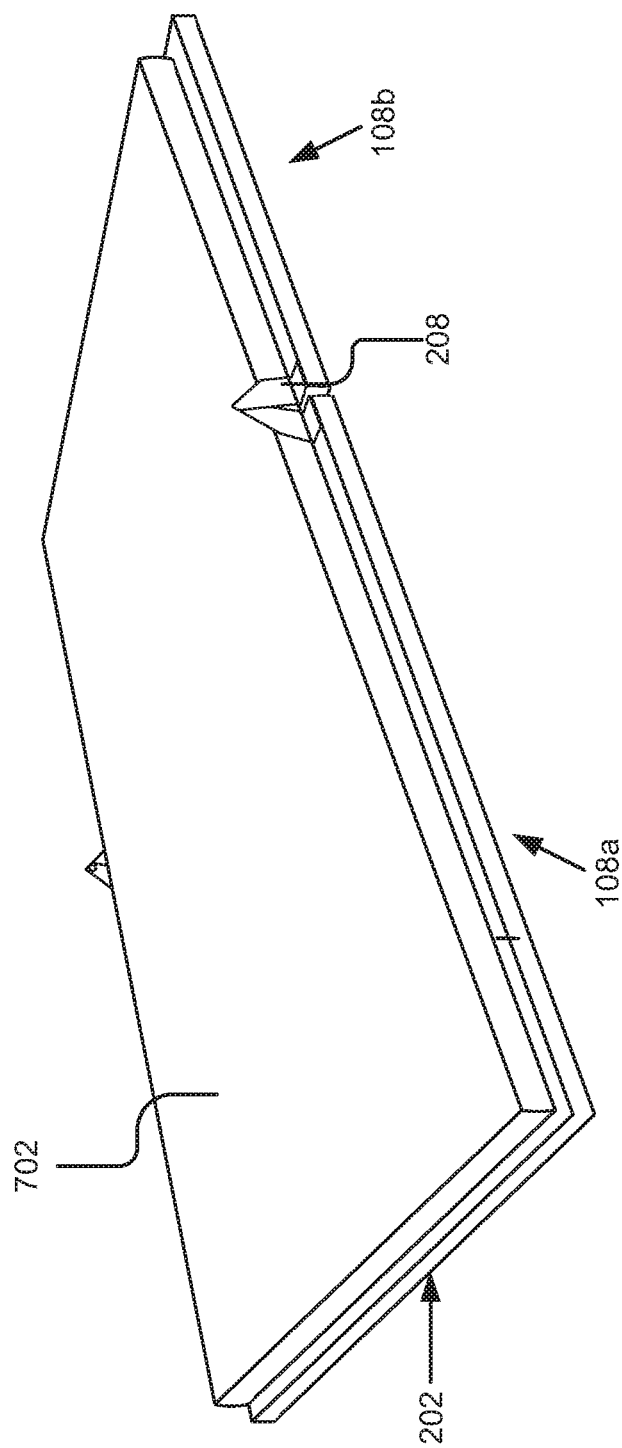
FIG. 7A is a perspective view of an example implementation of a rigid platform in an open position with an inflatable panel.

FIG. 7A is a perspective view of an example implementation of a rigid platform 202 in an open position with an inflatable panel 702. For instance, the base system 106 may include a rigid platform 202 and an inflatable panel 702 (e.g., an inflatable mattress pad or a drop stitch panel) coupled to the rigid platform 202. As illustrated, the rigid platform 202 may include a first base member 108 and a second base member 108 coupled together using a hinge 208. In some implementations, the inflatable panel 702 is a drop stitch panel 702 coupled with the first rectangular body of the first base member 108a along the first base member surface 206a and the second rectangular body of the second base member surface 206b of a second base member 108b. For example, a single drop stitch panel 702 may span both the first and second base members 108 to provide a substantially flat interior floor surface of the tent system 102. Although a single drop stitch panel 702 is illustrated, it should be noted that multiple drop stitch panels 702 are possible (e.g., as in the drop stitch panels 334 described above).

A drop stitch panel 702 may include any rigid inflatable panel, such as a panel constructed of an inflatable chamber with sides linked together using drop stitching, for example, as may be used in inflatable surfboards. Such drop stitch panels may be low pressure devices (e.g., 5 PSI to 15 PSI), the thickness of which may be configured based on the strength requirements of the application. For example, the drop stitch panel 702 illustrated in FIG. 7A may be 3 to 6 inches thick (e.g., with a thicker drop stitch panel 702 providing more rigidity), although other implementations are possible and contemplated herein.

In some implementations, the drop stitch panel 702 may provide rigidity or support to the rigid platform 202, so that the strength of the base system 106 is in the combination of the drop stitch panel 702 (e.g., when inflated) and the rigid platform 202. The drop stitch panel 702 may be attached or attachable to the base using an interconnecting member 806 (e.g., as described in reference to FIGS. 8-9C), Velcro, magnets, clamps, or D-rings (e.g., as described in reference to FIGS. 4A and 4B), etc.

Figure 7B:
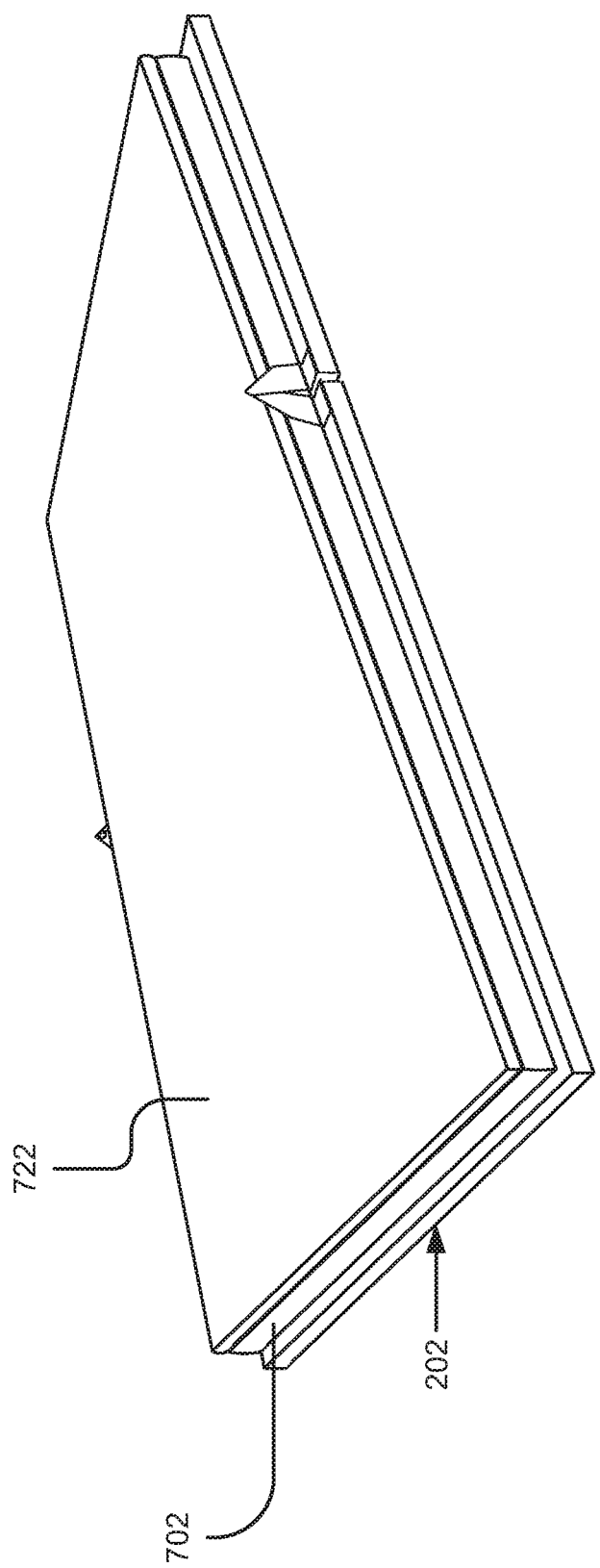
FIG. 7B is a perspective view of an example implementation of a rigid platform in an open position with an inflatable panel and a pad.

FIG. 7B is a perspective view of an example implementation of a rigid platform 202 in an open position with an inflatable panel, such as a drop stitch panel 702, and pad 722. The pad 722 may provide softness to a drop stitch panel 702. The pad 722 may be attached to or integrated with the drop stitch panel 702. For example, the base system 106 may include an inflatable mattress pad (e.g., 722) coupled with the drop stitch panel 702, the inflatable mattress pad (e.g., 722) resting on top of the drop stitch panel 702 when the tent system 102 is in an open position (e.g., as illustrated in FIG. 7B).

The pad 722 may be constructed from foam, fabric, or an air chamber, for example, the pad 722 may include an inflatable air mattress pad that may be coupled with the air delivery mechanism or may be separately inflatable (e.g., via a separate air port 210).

Figure 8:
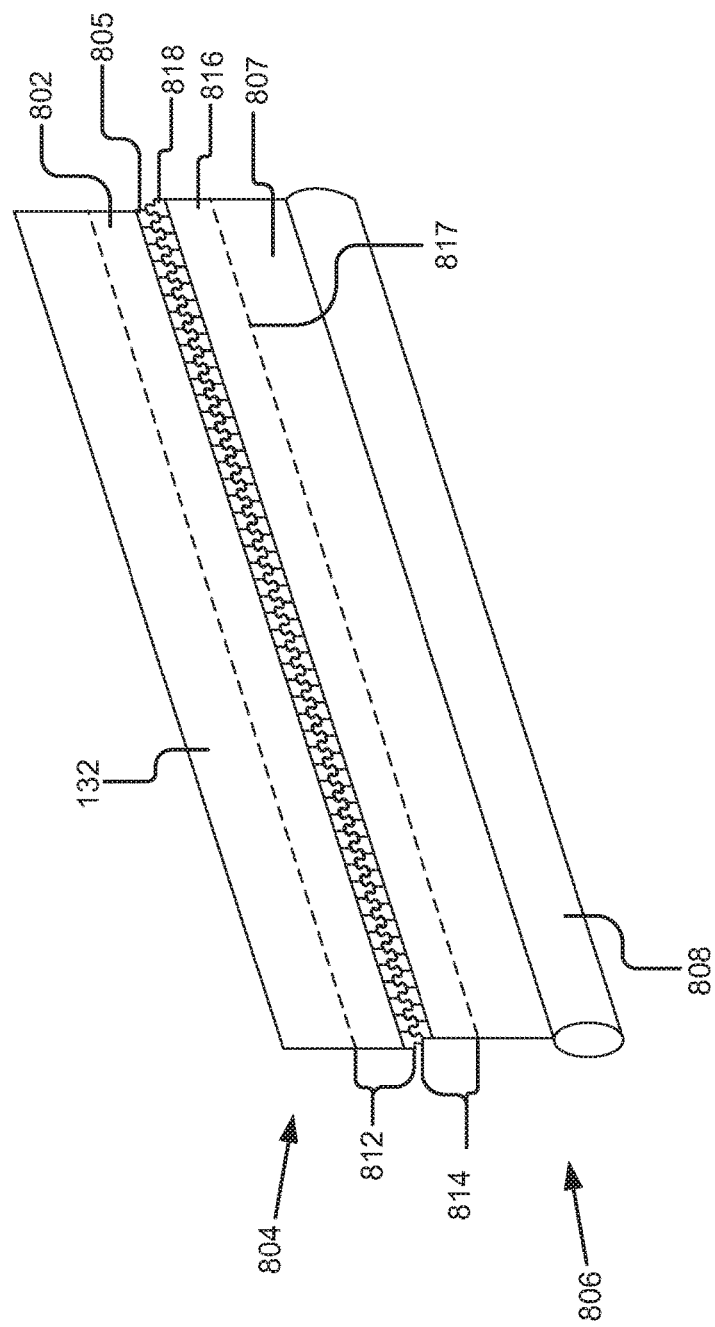
FIG. 8 is a perspective view of an example implementation of an interconnecting member mated to a canopy fastener.

FIG. 8 is a perspective view of an example implementation of an interconnecting member 806 mated to a canopy fastener 804. The interconnecting member 806 may serve as an adapter between the rigid platform 202 and the canopy 104, pad, drop stitch panel, etc., allowing one or more of these components to be detachably securable to the rigid platform 202.

FIG. 8 illustrates a section of a membrane edge 132 of the canopy 104 attached to the canopy fastener 804. The canopy fastener 804 is a fastener that detachably affixes the canopy 104 to the interconnecting member 806. In some implementations, a pad fastener may be used (e.g., in place of the canopy fastener 804, but having the same structure) for fastening a panel (e.g., an inflatable mattress pad 722, a drop stitch panel 702, etc.) to the base system 106 using the interconnecting member 806.

In the depicted implementation, the canopy fastener 804 includes a canopy zipper half 812 extending along and fixably attached to the membrane edge 132. A canopy zipper half 812 may include a zipper tape 802 and a series of zipper teeth 805 (also known as zipper elements) extending along and fixably attached to the zipper tape 802. The canopy fastener 804 may be adapted to mate with an interconnecting member fastener 816 of the interconnecting member 806. For example, as depicted, the interconnecting member fastener 816 includes an interconnecting member zipper half 814, which mates with the canopy zipper half 812.

It should be noted that, although the canopy fastener 804 and the interconnecting member fastener 816 are described as including a zipper/zipper halves, the fasteners may include other suitable fasteners, such as Velcro, magnets (e.g., a string of magnetic snaps, a magnetic strip, etc.), a series of snaps, a series of buttons, or any other suitable quick release mechanism.

The interconnecting member 806 illustrated in FIG. 8 may include an interconnecting member fastener 816, an interconnecting member body 807, and an attachment member 808. The interconnecting member body 807 may have a rectangular shape defining a first longitudinal edge 908 and a second longitudinal edge 912 (e.g., illustrated in FIG. 9A). The attachment member 808 may be attached to the interconnecting member body 807 along the first longitudinal edge 908 and the interconnecting member fastener 816 may be attached to the interconnecting member body 807 along the second longitudinal edge 912.

The interconnecting member body 807 may be constructed of the same or similar material as the flexible membrane of the canopy 104 or the interconnecting member body 807 may be constructed of a different material that is strong enough to bind the attachment member 808 to the interconnecting member fastener 816 (as well as resist any tension placed on the interconnecting member 806 from by the canopy 104, base member 108, or other component of the tent system 102). For example, the interconnecting member body 807 may be constructed of fabric, canvas, mesh, vinyl, nylon, polyester, etc. In some instances, the interconnecting member body 807 may be reinforced with additional layers of material and/or may be treated for weather resistance.

The attachment member 808 is configured to attach or otherwise connect with the base system 106, for example, the attachment member 808 may be attached to the interconnecting member body 807 along a first longitudinal edge 908. In some implementations, the attachment member 808 may be configured for insertion or other interaction with a channel 614, so that when the attachment member 808 is inserted into the channel 614, the interconnecting member 806 and the base member 108 are fixably attached together.

In some implementations, the attachment member 808 may include adhesive, screws, clamped fabric, a bolt cord 904, or other means of attaching the interconnecting member body 807 to the base member 108. In some implementations, the attachment member 808 may include a bolt cord 904 or welt cord. For example, the attachment member 808 may include a cord sewn into or otherwise connected to a longitudinal edge 908 of the interconnecting member body 807. Suitable materials for the cord may include a rope, a plastic or rubberized strand, cloth piping, roll of fabric, etc.

The interconnecting member fastener 816 may be any fastener configured to attach the interconnecting member body 807 to the canopy 104 (e.g., to the canopy fastener 804). The interconnecting member fastener 816 may be configured to mate with any one of a plurality of different canopy fasteners 804 so that when the interconnecting member fastener 816 and canopy fastener 804 are mated, the interconnecting member 806 and canopy 104 are detachably, but securely, connected. The interconnecting member fastener 816 may be attached to the interconnecting member body 807 along the second longitudinal edge 912 of the interconnecting member body 807.

In the implementation depicted in FIG. 8, the interconnecting member fastener 816 may include an interconnecting member zipper half 814. The interconnecting member zipper half 814 may have a zipper tape 817 and a series of zipper teeth 818 extending along and fixably attached to the zipper tape 817.

FIG. 9A is a perspective view of an example implementation of an interconnecting member 806, according to the present disclosure. As described above, the interconnecting member 806 may be a gimp 902, which includes a bolt cord 904. The bolt cord 904 may include a cord longitudinally attached to the gimp body 906 along a first longitudinal edge 908. The bolt cord 904 may be adapted for insertion into a channel 614 of the rigid platform 202. For example, the bolt cord 904 may interact with a base member 108 by sliding into the channel 614. In some implementations, because the bolt cord 904 may be difficult to slide into and/or out of the channel 614 on a base member 108, the bolt cord 904 may be attached to the base member 108 at the factory and may not be removable by a user. Moreover, although the attachment member 808 may be another mechanism than a bolt cord 904, as described above, the attachment member 808 may generally be a permanent or semi-permanent installation, so that it is difficult to easily or quickly remove from a base member 108, or install and align on the base member 108.

Further, the gimp 902 may include an interconnecting member fastener 816, such as a gimp zipper half 910 longitudinally attached to the gimp body 906 along the second longitudinal edge 912. An interconnecting member zipper half 814, such as the gimp zipper half 910 allows the canopy 104, pad, or drop stitch panels, etc., to be quickly attached or removed from the rigid platform 202. Further the gimp zipper half 910 automatically aligns and securely attaches the canopy 104 to a rigid platform 202.

FIG. 9B is a perspective view of an example implementation of an interconnecting member 952 (which is an implementation of the interconnecting member 806), according to the present disclosure. The interconnecting member 952 may include an attachment member 960 along a first longitudinal edge 962 of an interconnecting member body 958. The interconnecting member 952 may include a first interconnecting member fastener 954 and a second interconnecting member fastener 956 each attached to the interconnecting member body 958 along a second longitudinal edge 964. Similar to the interconnecting member fastener described elsewhere herein, the second interconnecting member fastener 956 may include an interconnecting member zipper half 814 with zipper tape 817 and series of zipper teeth 818 fixably attached to the zipper tape 817.

The second interconnecting member fastener 956 may be configured to mate with any one of a plurality of different fasteners, such as a fastener attached to at least a portion of a perimeter edge of an inflatable pad. For example, the second interconnecting member fastener 956 may mate with an inflatable pad (e.g., a drop stitch panel or an inflatable mattress pad) (e.g., with a pad fastener). For example, the first interconnecting member fastener 954 may connect a canopy 104 and the second interconnecting member fastener 956 may connect an inflatable pad, inflatable tent frame 204, or another component of the tent system 102.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above described implementations, implementations, and examples, but by all implementations, implementations, and examples, and other equivalents within the scope and spirit of the invention as claimed.

What is claimed is:

1. A tent system comprising:
a base system adapted to mount to a roof of a vehicle, the base system including a rigid platform with a perimeter edge and an air delivery mechanism integrated into the base system, the air delivery mechanism having an air port adapted to receive pressurized air, the base system including mounting hardware for attaching the tent system to the roof of the vehicle, the air delivery mechanism including a nozzle passing through a perforation in the rigid platform, the nozzle delivering the pressurized air to an inflatable tube;
an inflatable tent frame including the inflatable tube coupled with the base system, the inflatable tube having an air inlet coupled with the air delivery mechanism, the air inlet receiving the pressurized air from the air delivery mechanism into the inflatable tube, the inflatable tube adapted to support a tent canopy when the inflatable tube is inflated using the pressurized air; and
the tent canopy including a flexible membrane having a canopy fastener, the canopy fastener extending along a perimeter of the flexible membrane and adapted to attach the flexible membrane to the perimeter edge of the rigid platform, the tent canopy forming an interior cavity with the base system when the inflatable tube is inflated.

2. The tent system of claim 1, wherein
the rigid platform includes a first base member and a second base member, the first base member including a first rectangular body defining a first base member surface, the second base member including a second rectangular body defining a second base member surface, the first base member surface and the second base member surface forming an interior floor of the tent system when the tent system is in an open position, the second base member adapted to fold into a parallel plane over the first base member when the tent system is in a closed position; and
the base system includes a hinge coupling the first base member with the second base member, base system pivoting about an axis defined by the hinge to fold the second base member into the parallel plane over the first base member and position the tent system into the closed position.

3. The tent system of claim 2, wherein the air delivery mechanism is coupled with the hinge.

4. The tent system of claim 2, wherein
the second base member extends beyond a side of the vehicle when the tent system is in an open position, the second base member surface being substantially planar with the first base member surface when the tent system is in the open position; and
the base system includes a ladder attachable at an edge of the second base member, the ladder providing vertical support to the edge of the second base member.

5. The tent system of claim 4, wherein
the air port of the air delivery mechanism includes a valve integrated into the second base member proximate to the edge of the second base member, the valve connecting to an air hose, the valve receiving the pressurized air from the air hose.

6. The tent system of claim 2, wherein
the base system includes a drop stitch panel coupled with the first rectangular body along the first base member surface and the second rectangular body along the second base member surface, a top surface of the drop stitch panel providing a substantially flat interior floor surface of the tent system; and
the air delivery mechanism is coupled with the drop stitch panel and adapted to deliver the pressurized air to the drop stitch panel.

7. The tent system of claim 6, wherein
the base system includes an inflatable mattress pad coupled with the drop stitch panel, the inflatable mattress pad resting on top of the drop stitch panel when the tent system is in the open position; and
the air delivery mechanism is coupled with the inflatable mattress pad and adapted to deliver the pressurized air to the inflatable mattress pad.

8. The tent system of claim 2, wherein
the base system includes a first inflatable chamber coupled with the first rectangular body at the first base member surface and a second inflatable chamber coupled with the second rectangular body at the second base member surface, the first inflatable chamber and the second inflatable chamber coupled with the air delivery mechanism, the air delivery mechanism configured to deliver the pressurized air to the first inflatable chamber and the second inflatable chamber.

9. The tent system of claim 8, wherein
the first inflatable chamber includes a first drop stitch panel; and
the second inflatable chamber includes a second drop stitch panel.

10. The tent system of claim 8, wherein
the first base member includes a first raised edge and a first interior floor surface, the first interior floor surface being raised above the first raised edge when the first inflatable chamber is inflated by the pressurized air; and
the second base member includes a second raised edge and a second interior floor surface, the second interior floor surface being raised above the second raised edge when the second inflatable chamber is inflated by the pressurized air, the first interior floor surface being substantially level with the second interior floor surface when the first inflatable chamber and the second inflatable chamber are inflated.

11. The tent system of claim 1, wherein the air delivery mechanism includes a filling valve and a manifold, the filling valve receiving the pressurized air into the manifold, the manifold coupled with the air inlet of the inflatable tube of the inflatable tent frame to deliver the pressurized air from the filling valve to the inflatable tube.

12. The tent system of claim 11, wherein the manifold is integrated into the rigid platform.

13. The tent system of claim 12, wherein the manifold includes a tube located inside a body of the rigid platform, the tube connected to the filling valve and the air inlet of the inflatable tent frame.

14. The tent system of claim 11, wherein
the base system includes an inflatable mattress pad, the inflatable mattress pad coupled with the rigid platform, the inflatable mattress pad coupled with the manifold; and
the manifold is adapted to deliver the pressurized air from the filling valve to one or more of the inflatable mattress pad and the inflatable tent frame.

15. The tent system of claim 14, wherein the manifold includes a first valve controlling delivery of the pressurized air from the manifold to the inflatable tent frame and a second valve controlling delivery of the pressurized air from the manifold to the inflatable mattress pad.

16. The tent system of claim 1, wherein
the rigid platform includes a channel along at least a portion of the perimeter edge of the rigid platform;
the tent system includes an interconnecting member, the interconnecting member including an interconnecting member body, an attachment member, and a first zipper half, the interconnecting member body having a rectangular shape defining a first longitudinal edge and a second longitudinal edge, the attachment member attached to the interconnecting member body along the first longitudinal edge, the attachment member sized for insertion into the channel so that when the attachment member is inserted into the channel the interconnecting member and the rigid platform are fixably attached together, the first zipper half attached to the interconnecting member body along the second longitudinal edge, the first zipper half having a first zipper tape and first series of zipper teeth extending along and fixably attached to the first zipper tape; and
the canopy fastener of the tent canopy includes a second zipper half extending along and fixably attached along the perimeter of the flexible membrane, the second zipper half including a second zipper tape and a second series of zipper teeth extending along and fixably attached to the second zipper tape, the second zipper half mating with the first zipper half so that when the first zipper half and the second zipper half are mated the tent canopy is coupled to the rigid platform.

17. The tent system of claim 16, wherein
the interconnecting member includes a third zipper half attached along the second longitudinal edge of the interconnecting member body, the third zipper half having a third zipper tape and a third series of zipper teeth extending along and fixably attached to the third zipper tape; and
the base system includes a pad supported by the rigid platform, the pad having a body defining a perimeter edge, at least a portion of the perimeter edge of the pad including a fourth zipper half, the fourth zipper half having a fourth zipper tape and a fourth series of zipper teeth extending along and fixably attached to the fourth zipper tape, the fourth zipper half mating with the third zipper half so that when the fourth zipper half is mated with the third zipper half, the pad is coupled to the rigid platform.

18. A roof-top tent system comprising:
a base system adapted to mount to a roof of a vehicle, the base system including a rigid platform and an air delivery mechanism, the air delivery mechanism integrated into the base system, the rigid platform having a rigid surface defining a perimeter edge, the air delivery mechanism having a filling valve adapted to receive pressurized air into a manifold coupled with the rigid platform, the rigid platform including mounting hardware adapted to attach the roof-top tent system to a vehicle roof rack of the roof of the vehicle;
an inflatable mattress pad coupled with the rigid platform and supported by the rigid surface, the inflatable mattress pad including a first air inlet coupled with the manifold, the first air inlet receiving the pressurized air from the manifold into the inflatable mattress pad;

an inflatable tent frame including an inflatable tube coupled with the base system, the inflatable tube having a second air inlet coupled with the air delivery mechanism, the second air inlet receiving the pressurized air from the air delivery mechanism into the inflatable tube, the inflatable tube adapted to support a tent canopy when the inflatable tube is inflated using the pressurized air, the manifold coupled with the second air inlet of the inflatable tube of the inflatable tent frame to deliver the pressurized air from the filling valve to the inflatable tube, the manifold being adapted to deliver the pressurized air from the filling valve to one or more of the inflatable mattress pad and the inflatable tent frame; and the tent canopy including a flexible membrane having a canopy fastener, the canopy fastener extending along a perimeter of the flexible membrane and adapted to attach the flexible membrane to the perimeter edge of the rigid platform, the tent canopy forming an interior cavity with the base system when the inflatable tube is inflated.

19. A tent system comprising:

a base system adapted to mount to a roof of a vehicle, the base system including a rigid platform with a perimeter edge and an air delivery mechanism integrated into the base system, the air delivery mechanism having an air port adapted to receive pressurized air, the air delivery mechanism including a manifold coupled with the rigid platform, the manifold including a tube located inside a body of the rigid platform, the tube connecting the air port and an air inlet of an inflatable tube, the base system including mounting hardware for attaching the tent system to the roof of the vehicle;

an inflatable tent frame including the inflatable tube coupled with the base system, the inflatable tube having the air inlet coupled with the air delivery mechanism, the air inlet receiving the pressurized air from the air delivery mechanism into the inflatable tube, the inflatable tube adapted to support a tent canopy when the inflatable tube is inflated using the pressurized air; and the tent canopy including a flexible membrane having a canopy fastener, the canopy fastener extending along a perimeter of the flexible membrane and adapted to attach the flexible membrane to the perimeter edge of the rigid platform, the tent canopy forming an interior cavity with the base system when the inflatable tube is inflated.

20. A tent system comprising:

a base system adapted to mount to a roof of a vehicle, the base system including a rigid platform with a perimeter edge and an air delivery mechanism integrated into the base system, the air delivery mechanism having an air port adapted to receive pressurized air, the base system including mounting hardware for attaching the tent system to the roof of the vehicle, the rigid platform including a channel along at least a portion of the perimeter edge of the rigid platform;

an inflatable tent frame including an inflatable tube coupled with the base system, the inflatable tube having an air inlet coupled with the air delivery mechanism, the air inlet receiving the pressurized air from the air delivery mechanism into the inflatable tube, the inflatable tube adapted to support a tent canopy when the inflatable tube is inflated using the pressurized air;

the tent canopy including a flexible membrane having a canopy fastener, the canopy fastener extending along a perimeter of the flexible membrane and adapted to attach the flexible membrane to the perimeter edge of the rigid platform, the tent canopy forming an interior cavity with the base system when the inflatable tube is inflated;

an interconnecting member including an interconnecting member body, an attachment member, and a first zipper half, the interconnecting member body having a rectangular shape defining a first longitudinal edge and a second longitudinal edge, the attachment member attached to the interconnecting member body along the first longitudinal edge, the attachment member sized for insertion into the channel so that when the attachment member is inserted into the channel the interconnecting member and the rigid platform are fixably attached together, the first zipper half attached to the interconnecting member body along the second longitudinal edge, the first zipper half having a first zipper tape and first series of zipper teeth extending along and fixably attached to the first zipper tape; and the canopy fastener of the tent canopy including a second zipper half extending along and fixably attached along the perimeter of the flexible membrane, the second zipper half including a second zipper tape and a second series of zipper teeth extending along and fixably attached to the second zipper tape, the second zipper half mating with the first zipper half so that when the first zipper half and the second zipper half are mated the tent canopy is coupled to the rigid platform.

* * * * *